(12) United States Patent
Schmallen

(10) Patent No.: US 11,238,685 B2
(45) Date of Patent: Feb. 1, 2022

(54) RECOVERY ACCOUNTABILITY SYSTEM

(71) Applicant: Choice Recovery Path, LLC, Rio Rancho, NM (US)

(72) Inventor: Marc Schmallen, Albuquerque, NM (US)

(73) Assignee: CHOICE RECOVERY PATH, LLC, Rio Rancho, NM (US)

( * ) Notice: Subject to any disclaimer, the term of this patent is extended or adjusted under 35 U.S.C. 154(b) by 0 days.

(21) Appl. No.: 17/098,088

(22) Filed: Nov. 13, 2020

(65) Prior Publication Data

US 2021/0150838 A1 May 20, 2021

Related U.S. Application Data

(60) Provisional application No. 62/936,348, filed on Nov. 15, 2019.

(51) Int. Cl.

| | |
|---|---|
| *G07C 9/28* | (2020.01) |
| *H04W 4/021* | (2018.01) |
| *G07C 9/29* | (2020.01) |
| *G07C 9/25* | (2020.01) |
| *H04M 1/72451* | (2021.01) |
| *H04M 1/72457* | (2021.01) |
| *H04L 29/08* | (2006.01) |

(52) U.S. Cl.
CPC ............ *G07C 9/28* (2020.01); *G07C 9/257* (2020.01); *G07C 9/29* (2020.01); *H04M 1/72451* (2021.01); *H04M 1/72457* (2021.01); *H04W 4/021* (2013.01); *H04L 67/22* (2013.01)

(58) Field of Classification Search
CPC ............ G07C 9/28; G07C 9/29; G07C 9/257; H04M 1/72457; H04M 1/72451; H04W 4/021; H04L 67/22
See application file for complete search history.

(56) References Cited

U.S. PATENT DOCUMENTS

| | | | | |
|---|---|---|---|---|
| 2005/0027565 A1* | 2/2005 | Sader | ................... | G16H 20/70 705/2 |
| 2006/0003305 A1* | 1/2006 | Kelmar | ................... | G09B 7/02 434/350 |
| 2006/0229914 A1* | 10/2006 | Armstrong, II | ........ | G16H 40/60 705/2 |
| 2014/0311215 A1* | 10/2014 | Keays | ................... | A61B 5/082 73/23.3 |
| 2018/0139574 A1* | 5/2018 | Senger | ................... | H04W 4/029 |
| 2019/0034494 A1* | 1/2019 | Bradley | .............. | G06F 16/2457 |

* cited by examiner

*Primary Examiner* — Emily C Terrell
(74) *Attorney, Agent, or Firm* — Loza & Loza LLP; Kevin L. Soules

(57) ABSTRACT

A method and system for recovery accountability comprises adding at least one required action for display on a user device, with a partner device, displaying at least one required action on a user device, validating a user check-in and a user check-out associated with the at least one required action with the user device, tracking user completion of the at least one required action with the user device, and monitoring the user completion of the at least one required action with the partner device.

20 Claims, 26 Drawing Sheets

925 — MENU — Logged In

Compliance Report for John Doe
*This report covers 1 weeks.*

Report Key:
● Not Compliant     ● In Compliance

926 — Type of Requirement   Date/Time (if applicable)   Required or Bonus?   SSI Start Time Variance   SSI/BSI Duration   Compliance Status   Clear Judicial / Probation
(Fixed)

Items per page: 5   0 of 0   < >

Get in touch with us!
andrea@choicerecoverypath.com

FIG. 9E

RECOVERY ACCOUNTABILITY SYSTEM

CROSS REFERENCE TO RELATED PATENT APPLICATIONS

This patent application claims the priority and benefit, under 35 U.S.C. § 119(e), of U.S. Provisional Patent Application Ser. No. 62/936,348, filed Nov. 15, 2019, entitled "RECOVERY ACCOUNTABILITY SYSTEM." U.S. Provisional Patent Application Ser. No. 62/936,348 is herein incorporated by reference in its entirety.

TECHNICAL FIELD

Embodiments are generally related to the field of compliance and accountability. Embodiments are also related to the field of compliance tools. Embodiments are further related to the field of computer devices and mobile devices used for accountability and compliance. Embodiments are also related to methods, systems, and devices for implementing accountability and compliance indicators.

BACKGROUND

Human beings learn and grow throughout their lives. As we adapt to our environment—for better or worse, we naturally learn to survive in our environment. When people are adapted to an unhealthy environment, the behavior patterns that allow them to thrive may not work anywhere else. Those patterns can keep people stuck in a hopeless loop of relapse and recidivism, despite repeated efforts at rehabilitation. Without tools to change, it doesn't matter how much a person knows they "ought to" change. In particular, people with substance abuse issues almost universally understand that their lifestyle is unsustainable, and potentially life threatening, but they lack the tools to help them escape the cycle of self-destructive behavior.

Products or programs currently in use, drive forced compliance, and enforced accountability through passive monitoring. These systems are essentially based on negative reinforcement/"violation" centered models. In some cases, these systems include tools that are primitive and outdated.

While it should be obvious that such tools, like sign in sheets and so forth, are easily falsifiable, the reality is that for many struggling with addiction, the relationship with monitoring tools, including tools that make use of technology present an ongoing game of "cat and mouse." Forced accountability almost always leads to work arounds. For example, an addict may find someone to blow into their breathalyzer; manipulate ankle bracelet monitoring, and seek windows in which they can shake free. One common problem with current cell phone based systems is that users can hand their monitored phone to a friend or loved one so that it appears they are where they are supposed to be.

These systems are coercive, operating primarily through negative outcomes, threats and punishments. The systems do not encourage patients to learn new skills, and do not reward small successes along the way. As such, these prior art approaches overwhelmingly fail. The numbers are stunning. Current approaches result in 80-90% recidivism in most circumstances.

Accordingly, there is a need in the art for methods and systems that address the accountability requirements necessary for recovery, that include tools that help encourage accountability with positive reinforcement.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide improved methods and systems for compliance and accountability.

It is another aspect of the disclosed embodiments to provide a method, system, and apparatus for tracking and promoting accountability.

It is another aspect of the disclosed embodiments to provide methods, systems, and apparatuses for fostering improved recovery and accountability.

In the embodiments herein, a system, method, and apparatus for fostering recovery and accountability is disclosed. The embodiments have two basic purposes. The first, is to provide an interactive, real time relationship between a user and their accountability partner or manager, through the disclosed systems, to provide the user the tools necessary to learn to be accountable to themselves. In certain embodiments, the methods and systems can be used by those coming out of corrections facilities and entering drug or alcohol rehabilitation programs to meet their legal requirements and/or aftercare responsibilities. However, in other embodiments, use cases can include other situations or social structures where a client/employee/patient is responsible for being in a variety of locations at different times, and where there is an accountability partner who wants or needs to verify attendance at these appointments.

In certain embodiments, the systems and methods include a module for collecting location and image data, described herein as a "selfie sign in" both to confirm the identity of an attendee and to limit falsification, and to provide ongoing, real time confirmations of attendance across multiple, often disparate areas—i.e., medical, judicial, and drug testing appointments; work; school; community service; in the case of student athletes, attendance at a variety of classes, at tutoring, practice, workouts etc.

The second aspect is to provide a system for collecting analytic information on various levels, such analytic information being indicative of the performance of each participant at their respective level. The core of the disclosed embodiments is a database that allows various categories of appointment (as further detailed herein) along one axis, and compliance metrics along the other axis. The layout is modular, allowing for different categories in different industries/iterations.

Data collected through a mobile phone application or other such system is aggregated at different hierarchies, i.e. for managers, administrators and organizations. Managers have access to real time information about the clients' compliance, and may have risk indicators to flag those who are not signing in at their various appointments. Managers can see, in real time, whether clients are in full compliance and if not, what kinds of appointments they are missing. This allows managers to target interventions and to make those interventions before problems escalate.

In certain embodiments, the managers can fill a calendar that appears on the clients' device. The appointments, including non-time-specific stipulations, populate the calendar and are available to the client on the calendar and by push notification. The Client can add additional appointments to the calendar but cannot remove appointments set by their accountability partner. Appointments can be moved, changed or cancelled in real time by the manager, allowing flexibility and accuracy in scheduling.

Data from clients (again, entered by clients as they go, thereby requiring no further monitoring action from managers beyond setting the calendar) is aggregated on several levels: the manager can see his clients individually, and as a group; the administrator sees data from clients and from individual managers' clients; a "superadmin" sees data from the various administrators who work under him, and so on. The "superuser" can have global access to the data. In certain embodiments, the data available to the superadmin can be deidentified data from all the clients using the system and is able to aggregate across agencies, municipalities, and contexts.

The disclosed systems and methods can be realized as an accessible resource platform that allows organizations to aggregate and share community support resources that might support a person as they transition into a new way of life. This an include support resources such as job agencies, food banks, housing support, fitness and yoga classes, and scholarships and volunteer opportunities. The resource lists can be provided via the methods and systems so that even when a client leaves the locality at which they are admitted to a program, they can continue to find the services they need and check-in, using the system, to establish compliance. Similar mobility support simply is not possible using previous pen and paper check-in methods.

The resource platform also allows the client to find services they may need to complete the program without admitting to his accountability partners the degree of his or her need. For example, often a client needing literacy services, food, or other basics will hesitate to say so. Additionally, clients may be required to stay within proximity of their treatment/corrections program, even if they came from far away, because resources are unfamiliar and it's hard to keep track of their progress from further away. The resource platform allows clients to discreetly find services they may need, allows treatment professionals to refer to services including those outside their immediate area—and, ultimately, will allow different agencies and organizations to share resource lists, allowing new levels of cooperation and collaboration.

The core of the disclosed systems gives people the tools to begin adapting to new parameters in their life. It starts with helping them track the myriad responsibilities they now have—and builds on success with heavy doses of positive reinforcement for doing well, meeting metrics, exceeding requirements, and continuing to move forward. The system gives the user agency in relation to their own compliance metrics, to help them learn to meet their goals for themselves. By putting verification in the system instead of in the accountability partner, the dynamic of that relationship can shift from one of suspicion to support.

An individual that learns and grows and improves and brings positivity to their family and friends. It webs out from the individual to the larger community. Success in treatment both fosters and is contingent on hope, optimism, and positive reinforcement.

In an exemplary embodiment, an accountability system comprises a user device, the user device comprising a GPS receiver, a camera, and a computer system, the computer system further comprising: at least one processor, a graphical user interface, and a computer-usable medium embodying computer program code, the computer-usable medium capable of communicating with the at least one processor, the computer program code comprising instructions executable by the at least one processor and configured for: displaying at least one required action, validating a user check-in and a user check-out associated with the at least one required action, and tracking user completion of the at least one required action.

The exemplary accountability system further comprises a partner device, the partner device comprising a second computer system, said second computer system further comprising at least one processor and a computer-usable medium embodying computer program code, the computer-usable medium capable of communicating with the at least one processor, the computer program code comprising instructions executable by the at least one processor and configured for: adding the at least one required action for display on the user device and monitoring the user completion of the at least one required action. The accountability system further comprises an accountability module, the accountability module being configured for generating a calendar served to the client device with a calendar module according to the at least one required action added with the partner device.

In an embodiment the calendar module further displays the at least one required action on a calendar displayed on the user device.

In an embodiment, the accountability system further comprises a user sign in module, the user sign in module configured for: identifying a current time, identifying a current location of the user device, and collecting an image of the user with the user device. In certain embodiment the system is configured for verifying the image of the user against a stored image, verifying the current location of the user device is within a geofenced location associated with a current required action, and verifying the current time matches a time associated with a current required action.

In an embodiment, the system is configured for providing a resource list provided on the user device with the graphical user interface.

In certain embodiments, the systems and methods include an alerts module, the alerts module configured for providing a notification of at least one of: an upcoming required action and a missed required action.

In certain embodiment, the at least one required action further comprises a type comprising one of: a 12 step program, a judicial/probation requirement, a testing requirement, an individual counseling requirement, a group counseling requirement, a community service requirement, a medical requirement, a work requirement, and an other requirement. The at least one required action displayed on the user device can be color coded according to the type.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 9E depicts a compliance report displayed on a user interface associated with a partner portal displayed on a partner device, in accordance with the disclosed embodiments;

DETAILED DESCRIPTION

Figure 1:
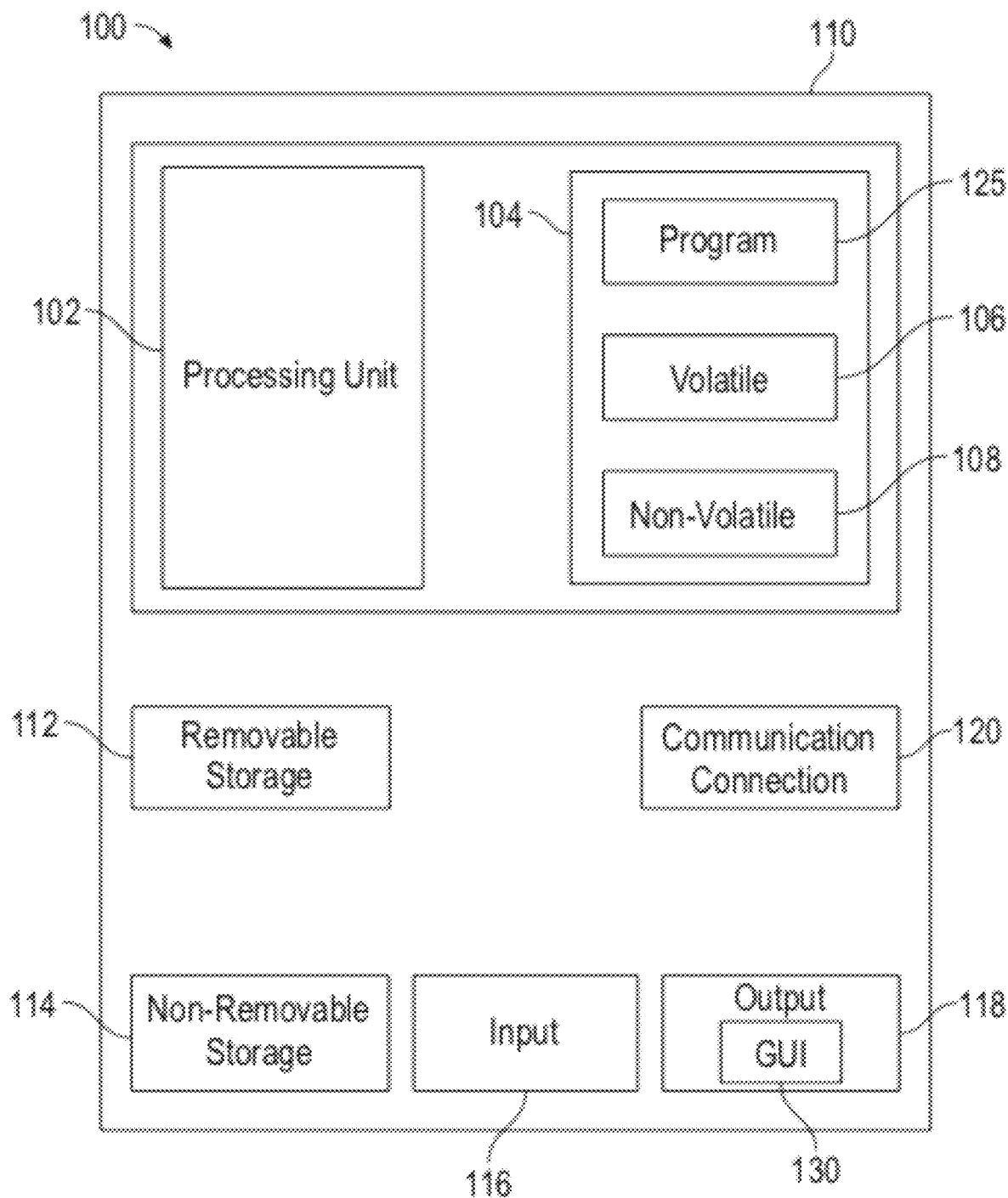
FIG. 1 depicts a block diagram of a computer system which is implemented in accordance with the disclosed embodiments.

The particular values and configurations discussed in the following non-limiting examples can be varied, and are cited merely to illustrate one or more embodiments and are not intended to limit the scope thereof.

Example embodiments will now be described more fully hereinafter, with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, Aft AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, Aft BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Figure 2:
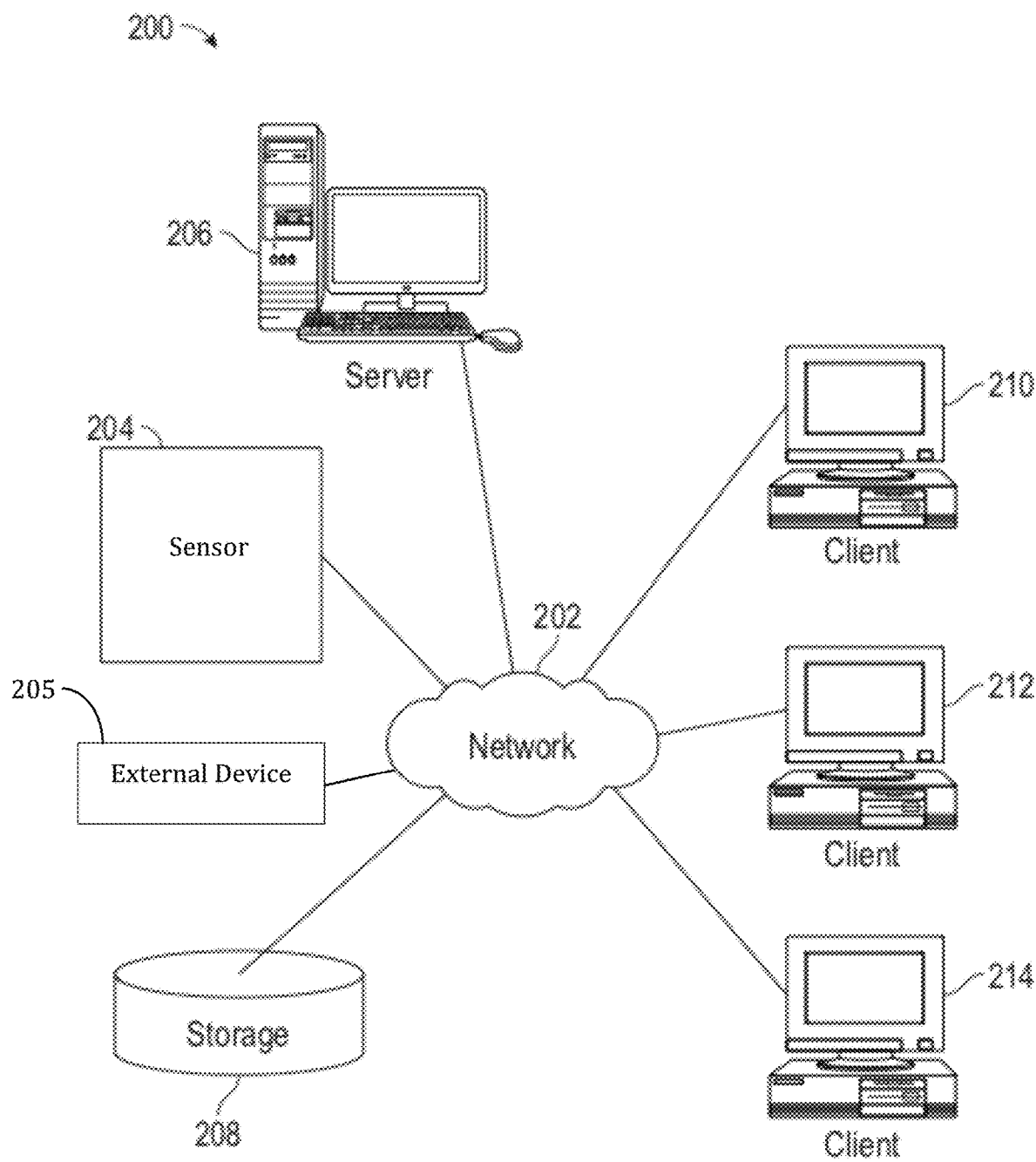
FIG. 2 depicts a graphical representation of a network of data-processing devices in which aspects of the present embodiments may be implemented.
Figure 3:
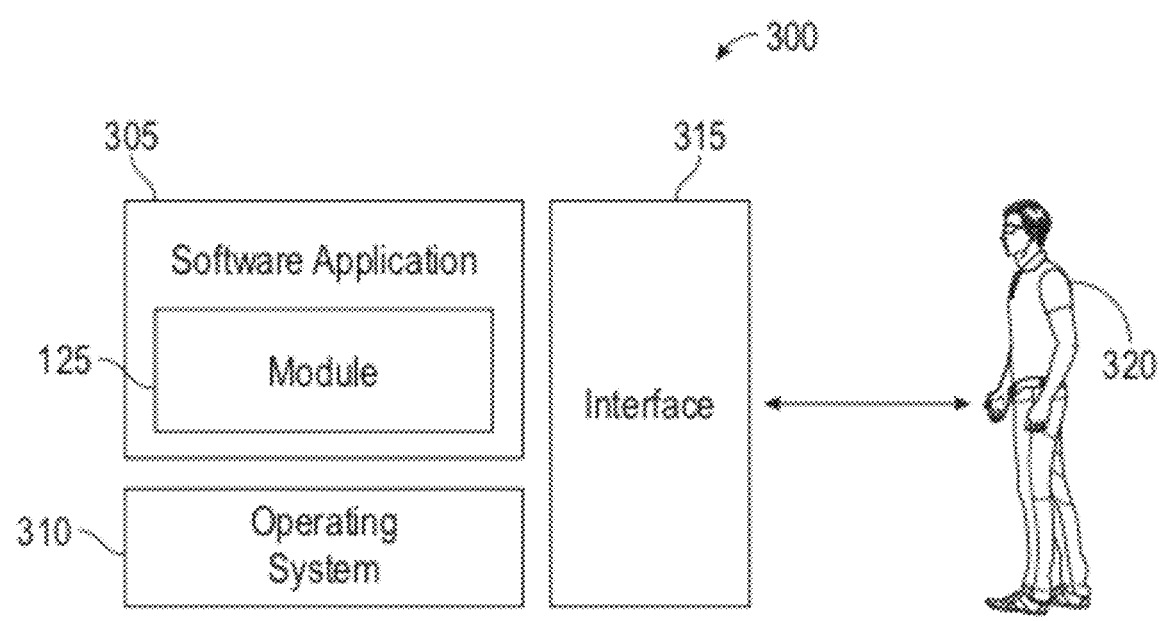
FIG. 3 depicts a computer software system for directing the operation of the data-processing system depicted in FIG. 1, in accordance with an example embodiment.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing parts of the methods and systems disclosed herein is shown in FIG. 1. A computing device in the form of a computer 110 configured to interface with sensors, peripheral devices, and other elements disclosed herein may include one or more processing units 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Computer 110 may include or have access to a computing environment that includes input 116, output 118, and a communication connection 120. The computer may operate in a networked environment using a communication connection 120 to connect to one or more remote computers, remote sensors, detection devices, hand-held devices, multi-function devices (MFDs), mobile devices, tablet devices, mobile phones, Smartphones, or other such devices. The remote computer may also include a personal computer (PC), server, router, network PC, RFID enabled device, a peer device or other common network node, or the like. The communication connection may include a Local Area Network (LAN), a Wide Area Network (WAN), Bluetooth connection, or other networks. This functionality is described more fully in the description associated with FIG. 2 below.

Output 118 is most commonly provided as a computer monitor, but may include any output device. Output 118 and/or input 116 may include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user, and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module or node 125, which can be representative of other modules or nodes described herein, are stored on a computer-readable medium and are executable by the processing unit 102 of computer 110. Program module or node 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 is a network of computers or other such devices such as mobile phones, smartphones, sensors, detection devices, and the like in which embodiments of the present invention may be implemented. Note that the system 200 can be implemented in the context of a software module such as program module 125. The system 200 includes a network 202 in communication with one or more clients 210, 212, and 214, and external device 205. Network 202 may also be in communication with one or more RFID and/or GPS enabled devices or sensors 204, servers 206, and storage 208. Network 202 is a medium that can be used to provide communications links between various devices and computers connected together within a networked data processing system such as computer system 100. Network 202 may include connections such as wired communication links, wireless communication links of various types, fiber optic cables, quantum, or quantum encryption, or quantum teleportation networks, etc. Network 202 can communicate with one or more servers 206, one or more external devices such as RFID and/or GPS enabled device 204, and a memory storage unit such as, for example, memory or database 208. It should be understood that RFID and/or GPS enabled device 204 may be embodied as a mobile device, cell phone, tablet device, monitoring device, detector device, sensor microcontroller, controller, receiver, transceiver, or other such device.

In the depicted example, RFID and/or GPS enabled device 204, server 206, and clients 210, 212, and 214 connect to network 202 along with storage unit 208. Clients 210, 212, and 214 may be, for example, personal computers or network computers, handheld devices, mobile devices, tablet devices, smartphones, personal digital assistants, microcontrollers, recording devices, MFDs, etc. Computer system 100 depicted in FIG. 1 can be, for example, a client such as client 210 and/or 212.

Computer system 100 can also be implemented as a server such as server 206, depending upon design considerations. In the depicted example, server 206 provides data such as boot files, operating system images, applications, and application updates to clients 210, 212, and/or 214. Clients 210, 212, and 214 and RFID and/or GPS enabled device 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) or node(s) 125, may be "loaded" (i.e., transferred from removable storage 114 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that elements of the disclosed methods and systems may be practiced with other computer system configurations such as, for example, handheld devices, mobile phones, smart phones, tablet devices, multi-processor systems, printers, copiers, fax machines, multi-function devices, data networks, microprocessor-based or programmable consumer electronics, networked personal computers, minicomputers, mainframe computers, servers, medical equipment, medical devices, and the like.

Note that the term module or node as utilized herein may refer to a collection of routines and data structures that perform a particular task or implements a particular abstract data type. Modules may be composed of two parts: an interface, which lists the constants, data types, variables, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of, or require the use of a data-processing system such as computer system 100, in conjunction with program module 125, and data-processing system 200 and network 202 depicted in FIGS. 1-3. The present invention, however, is not limited to any particular application or any particular environment. Instead, those skilled in the art will find that the systems and methods of the present invention may be advantageously applied to a variety of system and application software including database management systems, word processors, and the like. Moreover, the present invention may be embodied on a variety of different platforms including Windows, Macintosh, UNIX, LINUX, Android, Arduino and the like. Therefore, the descriptions of the exemplary embodiments, which follow, are for purposes of illustration and not considered a limitation.

In the embodiments herein, a system, method, and apparatus for fostering recovery and accountability is disclosed. The embodiments have two basic purposes. The first, is to provide an interactive, real time relationship between a user and their accountability partner or manager, through the disclosed systems, to provide the user the tools necessary to learn to be accountable to themselves. In certain embodiments, the methods and systems can be used by those coming out of corrections facilities and entering drug or alcohol rehabilitation programs to meet their legal requirements and/or aftercare responsibilities. However, in other embodiments, use cases can include other situations or social structures where a client/employee/patient is responsible for being in a variety of locations at different times, and where there is an accountability partner who wants or needs to verify attendance at these appointments.

Figure 4:
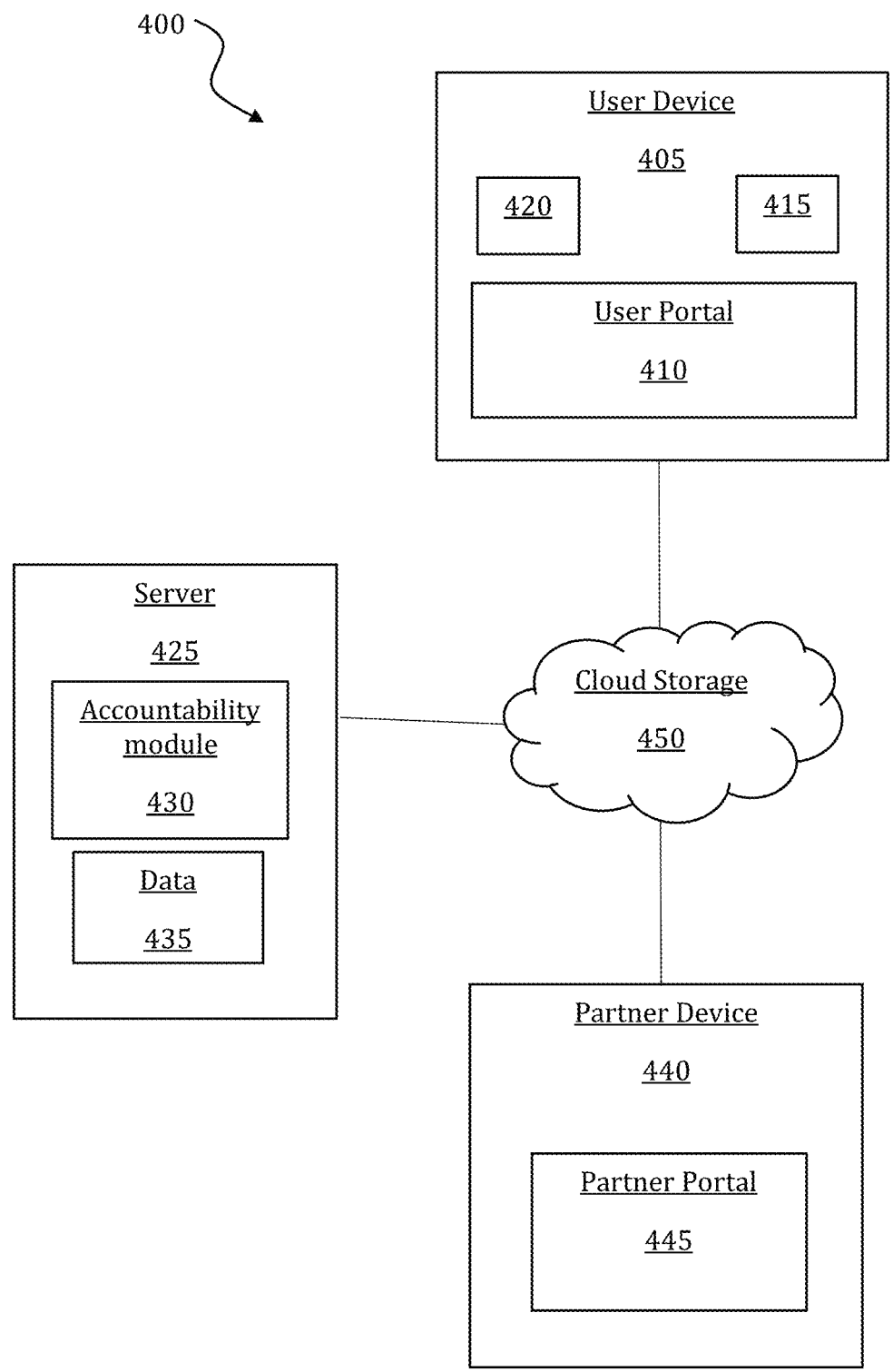
FIG. 4 depicts a block diagram of a system for accountability, in accordance with the disclosed embodiments.

FIG. 4 illustrates a block diagram of a system 400 for teaching compliance and accountability. The system can generally include a mobile device, or user device 405 that provides a user portal 410. The user portal 410 can serve as the interface through which the patient (or user) interacts with the system 400.

As illustrated in FIG. 4, the user device 400 can be any device that can take screenshots and is equipped with a camera 415, and has a GPS receiver 420, such that the device 405 can verify position and time. In certain embodiments, the user device 405 can comprise a mobile device, or smart phone, a tablet device, a computer, a smart watch, or other such device.

The user device 405 can be equipped with a user portal 410. In certain cases, the user portal 410 can comprise a standalone software module (e.g. an app). In other embodiments, the user portal 410 can be a web portal. The user portal 410 serves as the interface through which the user interacts with the compliance and accountability system 400. The interface can comprise a specially designed graphical user interface that allows the user to receive alerts relating to scheduling, and verify that the user has complied with a given requirement. This can be achieved in a number of ways as further detailed herein.

The mobile device 405 can interact with other aspects of the system through a wired or wireless connection via the world wide web. In certain embodiments, this can be achieved using a cloud computing architecture. In certain embodiments, a server 425 can provide data 435 storage and can provide an accountability module 430.

The system 400 further includes a partner device 440. The partner device 440 can comprise a mobile device, or smart phone, a tablet device, a computer, a smart watch, or other such device. The partner device 440 can be equipped with a partner portal 445. The partner portal 445 serves as the interface through which the partner interacts with the compliance and accountability system 400. An interface associated with the partner portal 445 can comprise a specially designed graphical user interface that allows the partner to set and receive alerts relating to scheduling, monitor user compliance, send messages to a user, and monitor success metrics. It should be understood that the partner device 440 can comprise multiple devices accessible by multiple partners. Such access can be hierarchical as further detailed herein.

The accountability module 430 can comprise the root application (or software) that is used to control the system. The server 425 can serve data to, and accept data from, the user device 405 and partner device 440. In other embodiments, cloud storage 450 can be used to store some or all of the relevant data and/or software associated with the system 400.

Figure 5:
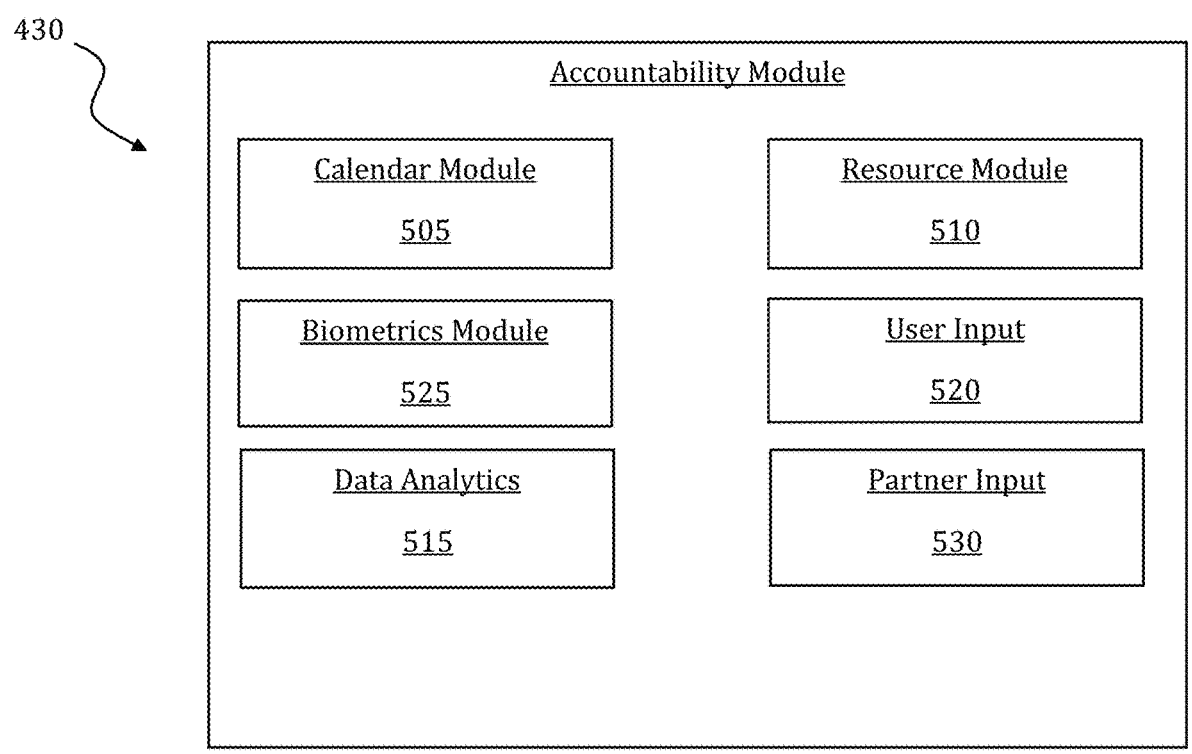
FIG. 5 depicts a block diagram of an accountability module, in accordance with the disclosed embodiments.

FIG. 5 illustrates a system diagram of the accountability module 430. The accountability module 430 can include a calendar module 505 that is at the core of the system 400. The calendar module 505 can be connected to a partner input 530 associated with the partner device 440. Note this input can comprise a hardwired or wireless communications connection.

The calendar module 505 can be used to set various appointments for the user. In an exemplary embodiment, the calendar module 505 can be accessed by the partner device 440. The partner can schedule various appointments in a calendar associated with the calendar module 505. Such appointments can be, for example, a parole meeting, a 12 step meeting, a therapy session, a group therapy session, etc. The calendar module 505 can include data fields in a structured database indicative of the type of appointment, the time of the appointment, and the location of the appointment. In certain embodiments, the accountability module 430 can use the location of the appointment to create a geofence indicative of a real world location associated with the location of the appointment. The partner can set the parameters of the geofence. For example, the geofence can be a set size or location. The structured database can also include a field that allows the partner to identify an appointment as mandatory or suggested. The calendar module 505 can then populate an interactive calendar provided on the user device via the user portal 410. Modifications to the calendar made by the partner on the partner device 440 can update the calendar provided via the user portal 410.

The accountability module 430 can further include a resource module 510. The resource module 510 can comprise a list of resources available to the user. The list can be sorted manually by the partner via the resource module 825 in the partner portal 445, to provide those resources most applicable to a given user nearer to the top of the list. The list can also be automatically sorted according to data taken from the calendar module 505. For example, the resource module 510 can adjust the resources list to identify resources related to counseling, when the next appointment on the calendar is a therapy session. The resource module 510 can then serve the resource list to the user device 405 for display in the user portal 410 via resource module 625.

The accountability module 430 can further include a data analytics module 515 that can be used to collect and sort data associated with each user. The following is an exemplary explanation of ways the data in the system 400 is cultivated, stored, and transmitted. The charts provided below (charts 1-5) show a 9×5 table of data, but other metrics can be used in other embodiments which would change the number of cells in the table. Fixed and variable appointments can be part of event type as one item. Thus, for each user a 9×4 dataset is developed, though the exemplary grids show 9×5.

Figure 11:
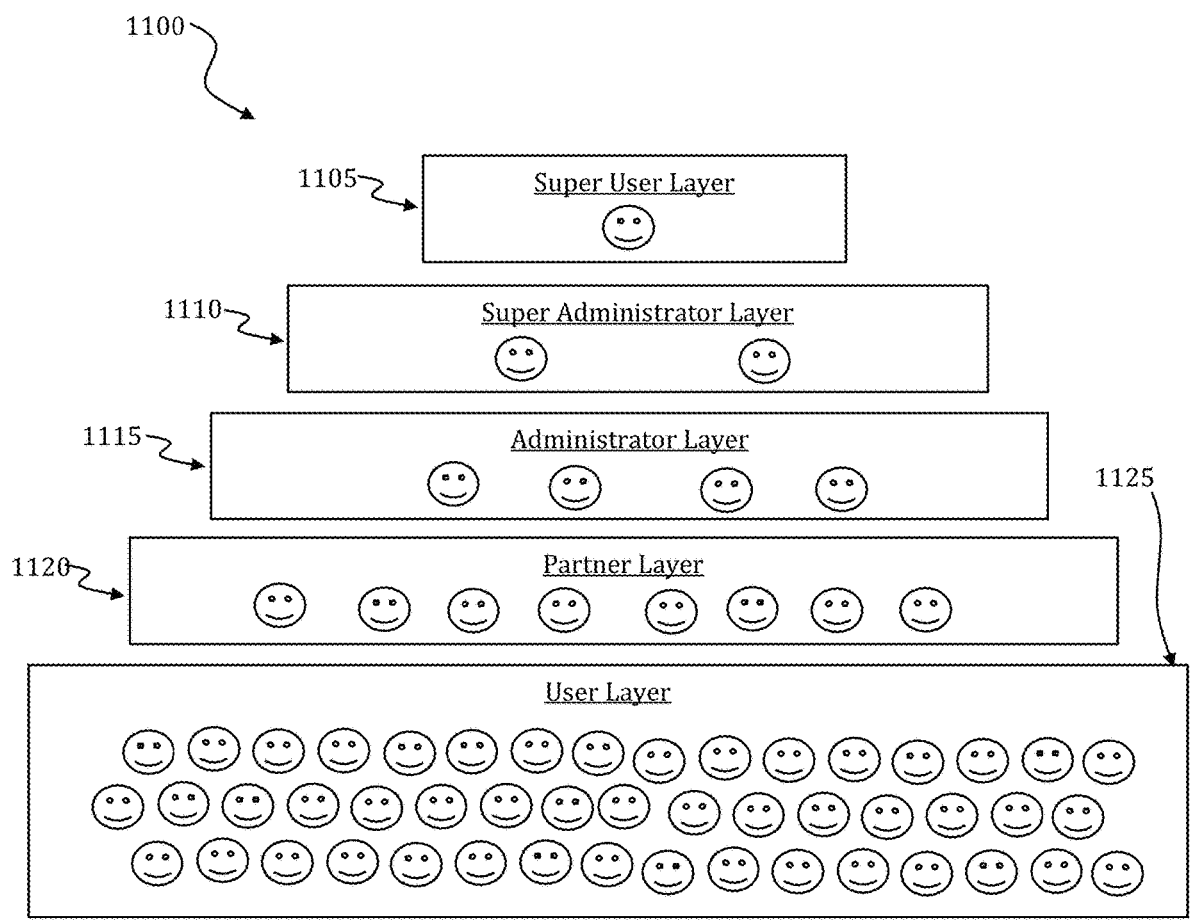
FIG. 11 depicts hierarchical architecture of user layers, in accordance with the disclosed embodiments.

A hierarchical system of data distribution are a part of the system 400 that allows partners to evaluate the metrics of those in lower tiers of the hierarchy. The hierarchical scheme 1100 is illustrated in FIG. 11. As illustrated, a series of hierarchical access layers provide access control to various data. The access layers can include Super user layer 1105, Super administrator layer 1110, administrator layer 1115, partner layer 1120, and user layer 1125.

In an exemplary embodiment, a superuser in the super user layer 1105 can add a superadmin in the super administrator layer 1110, administrators in the administrator layer 1115, managers in the partner layer 1120, and clients in the user layer 1125. Likewise, Superadmins can add administrators, managers, and clients. Administrators can add other administrators, managers and clients. Managers can ONLY add clients. Clients can ONLY access their own data, and cannot amend, change, or delete it. Further client's in the user layer 1125 can, for example, add their own calendar items but can only delete or amend items they have added themselves.

As illustrated in the charts 1-5 various metrics associated with user behavior can be collected. Those metrics can, for example be based on 9 categories, with 4 cross referencing categories. These can include appointments required; number made; percentage of total made; and aggregating total made. Every client in the user layer 1125 can see only their own data.

Manager metrics aggregate the total metrics of all clients in the user layer 1125 working with a given manager in the partner layer 1120, into a set of metrics for that manager based on the same criteria. Thus, each manager in the partner layer 1120 will have access to individual data and aggregated data for their clients. The manager can access their total metrics and their individual clients' metrics.

Administrators in the administrator layer 1115 can have access to the same categories, but can also have access to aggregated data for every manager in the partner layer 1120, under that administrator. Similarly, superadmins in the super administrator layer 1110, can access the same 9×4 categories, but can also access aggregate data for every administrator in the administrator layer 1115 under that superadmin. It should be noted that certain organization may not have or need one or more of the layers such as the super administrator layer 1110.

The Superuser can access aggregate data totals from all the layers using the system 400. Over time, the data can be segregated into: data by geographical areas; data by organization types (judicial, health care, education); organizations within types (one health insurance company v. another insurance company, etc.). Data aggregation can be flexible and expandable. Ideally, metrics can be based on industry type, and geographical area (city, county, state). It may be that the rollup from city to county to state is analogous to the rollup from manager to administrator to superadmin.

CHART 1

| Client sees only his data | | | | | |
|---|---|---|---|---|---|
| 12 step | variable | required | made | % | total |
| PO/judicial | fixed | | | | |
| Test | variable | | | | |
| individual | fixed | | | | |
| Group | fixed | | | | |
| Community service | variable | | | | |
| Medical | fixed | | | | |
| School/work | variable | | | | |
| Other | fixed | | | | |

CHART 2

| Manager sees client, all of her clients | | | | | |
|---|---|---|---|---|---|
| 12 step | variable | required | made | % | total |
| PO/judicial | fixed | | | | |
| Test | variable | | | | |
| individual | fixed | | | | |
| Group | fixed | | | | |
| Community service | variable | | | | |
| Medical | fixed | | | | |
| School/work | variable | | | | |
| Other | fixed | | | | |

CHART 3

| Administrator sees all clients, all managers | | | | | |
|---|---|---|---|---|---|
| 12 step | variable | required | made | % | total |
| PO/judicial | fixed | | | | |
| Test | variable | | | | |
| individual | fixed | | | | |
| Group | fixed | | | | |
| Community service | variable | | | | |
| Medical | fixed | | | | |
| School/work | variable | | | | |
| Other | fixed | | | | |

CHART 4

| SuperAdministrator sees all clients, managers, administrators | | | | | |
|---|---|---|---|---|---|
| 12 step | variable | required | made | % | total |
| PO/judicial | fixed | | | | |
| Test | variable | | | | |
| individual | fixed | | | | |
| Group | fixed | | | | |
| Community service | variable | | | | |
| Medical | fixed | | | | |
| School/work | variable | | | | |
| Other | fixed | | | | |

CHART 5

| Superuser Sees all | | | | | |
|---|---|---|---|---|---|
| 12 step | variable | required | made | % | total |
| PO/judicial | fixed | | | | |
| Test | variable | | | | |
| individual | fixed | | | | |
| Group | fixed | | | | |
| Community service | variable | | | | |
| Medical | fixed | | | | |
| School/work | variable | | | | |
| Other | fixed | | | | |

In certain embodiments, the data can be represented as a three-dimensional data model with the X- and Y-axes used to build the 9×4 grid, with Y-axis representing up to nine stipulations with which the client is asked to comply, and the X-axis representing ways to measure compliance. The Z-axis represents layers of data aggregation: client, manager, administrator (and super-administrators, as needed).

It is important to appreciate that data as outlined above, can populate data structures in accordance with charts 1-5. All the data is derived from client action. Aggregation across data sets allows administrators to work with client data in a variety of ways. The resulting information can be used for comparing compliance. For example, the data will illustrate that a given client attends testing but not meetings, or meetings but not group therapy, etc. The system 400 can thus be used to pinpoint for example, that manager A has clients who consistently go to meetings but not group, or that Manager B has clients who consistently outperform or underperform other managers' clients.

Superuser data can integrate—for the first time—bona fide aftercare statistics between and among healthcare and correctional contexts. In this way the system 400 can be used to track a client in and through the judicial and medical systems, to be able to see clearly "what works" and at what point a client shifts into compliance and recovery even after long periods of non-compliance and/or recidivism.

Aggregated data, populated in the data structures further allows managers to see, via the partner portal 445, how their clients are doing holistically, and allows managers and administrators to identify outliers—positive and negative—overall or among any of the variables illustrated in Charts 1-5 (i.e. along the Y-axis). In this way, administrators are able to evaluate the overall success of their program as a whole. In particular, they can make the meaningful assessments of their managers, pinpointing particular areas along the Y-axis wherein a given manager's clients are outliers, positive or negative—and to assess overall how and whether particular managers' clients are doing particularly well or poorly, again, in real time.

Metrics can be collected from the user device via the user portal 410 and can then be transferred to cloud storage 450 for cloud-based data aggregation. Such storage can be associated with the server 425. Data can be delivered to the user portal 410 and partner portal 445 via the accountability module 430, where the calendar is established, updated and maintained, and where user compliance is verified.

Figure 6:
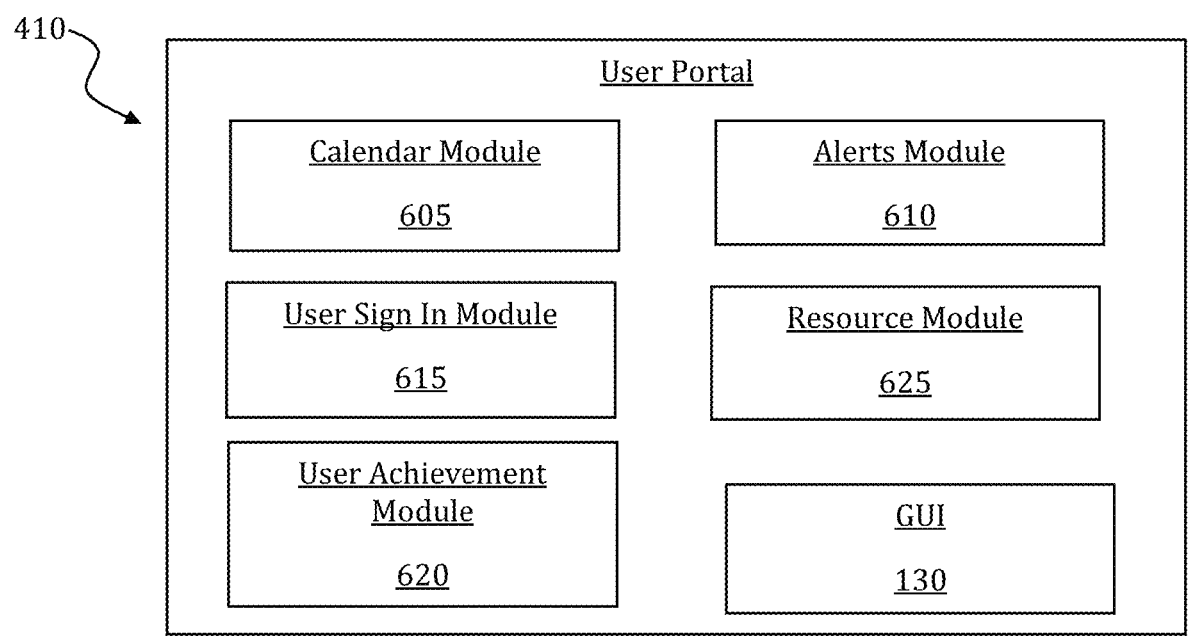
FIG. 6 depicts a block diagram of a user portal, in accordance with disclosed embodiments.

The user portal 410 serves as the interface through with the user interacts with the accountability system 400 and is further illustrated in FIG. 6. The user portal 410 can be embodied as specially designed software that is executed by a mobile device or other computer system such as computer system 100. The user portal 410 can include a user interface embodied as a graphical user interface, such as GUI 130. The user portal 410 allows the user to interact with the calendar module 605. The interface 130 can display upcoming appointments, and identify those appointments as mandatory or suggested, according to the designation entered by the partner via the calendar module 505. The user interface can inform the user of the type, time, and place of the appointment.

An alerts module 610 can be used to alert the user to upcoming appointments. The alerts module 610 can send push notifications, or other such notification to alert a user that an appointment is upcoming, or that the appointment has been missed. The alerts module 610 can similarly send an alert to the partner when an appointment is missed.

The user portal can further include a user sign-in module 615. The user sign-in module is a critically important feature of the present embodiments. The user sign-in module 615, is a cornerstone of the accountability system 400 that allows the system 400 to operation a way that would not be possible with standard human verification approaches. The user sign-in module 615 can be used to verify that the user has attended an appointment or has otherwise met the requirement of being at a specific place at a specific time. Upon reaching the designated location of the appointment, the user device 405 can check the location of the user with the GPS receiver 420, or via location services associated with the user device 405. The user sign-in module 615 can verify the user is currently within the geofence, or otherwise generally at the location, for the appointment established by the partner. The user can next be prompted to take a photograph of themselves. The photograph, along with the user's location, and time, can be recorded and transmitted to the accountability module 430 as a check-in.

When the appointment ends, the user can similarly take a photograph of themselves using the camera 415 associated with the user device 405. The photograph, along with the user's location, and time can be recorded and transmitted to the accountability module 430 as a check-out.

The accountability module 430 can verify the check-in and check-out data against the appointment data. For example, the accountability module 430 can verify that the check-in time was within a preset threshold of the appointment start time, and that the check-out time was within a preset threshold of the appointment end time.

The accountability module 430 can include biometrics verification software module 525 that can compare the check-in photograph and the check-out photograph against a pre taken photograph, to ensure that the person in the photograph is the user. The system can use facial recognition software, to verify the face in the photograph matches the previously saved image. Similarly, the accountability module 430 can verify that the check-in location is within the geofence established by the partner, and that the check-out location is within the geofence established by the partner. In certain embodiments, the user device 405 can further indicate information associated with the network connection used to transmit the check-in and check-out data. The accountability module 430 can verify that the network connection information used to transmit the check-in and check-out data matches the network connection information at the check-in and check-out location. It should be appreciated that the check-in and check-out locations can be selected to not be identical if necessary.

Once the accountability module 430 receives the user data at a user input 520, associated with the check-in and check-out data, the data can be provided to the data analytics module 515. The accountability module 430 can update the user's calendar module 605 to indicate that the user successfully kept the appointment, partially kept the appointment, or missed the appointment. The calendar module 605 can update the user achievement module 620 to create a log, viewable by the user, of the successful completion of various appointments. The appointments can be color coded in the user achievement module. For example, successfully completed appointments can be coded green, partially completed appointments can be coded yellow, and missed appointments can be coded red. For suggested appointments, only successfully completed appointments can be displayed in the user achievement module 620.

FIGS. 7A-7H illustrate screen shots of a user portal interface 700 in accordance with an exemplary embodiment of the system 400. It should be appreciated that these represent one embodiment of the user portal interface 700, and that the user portals 410 could be embodied with other user interfaces 700.

Figure 7A:
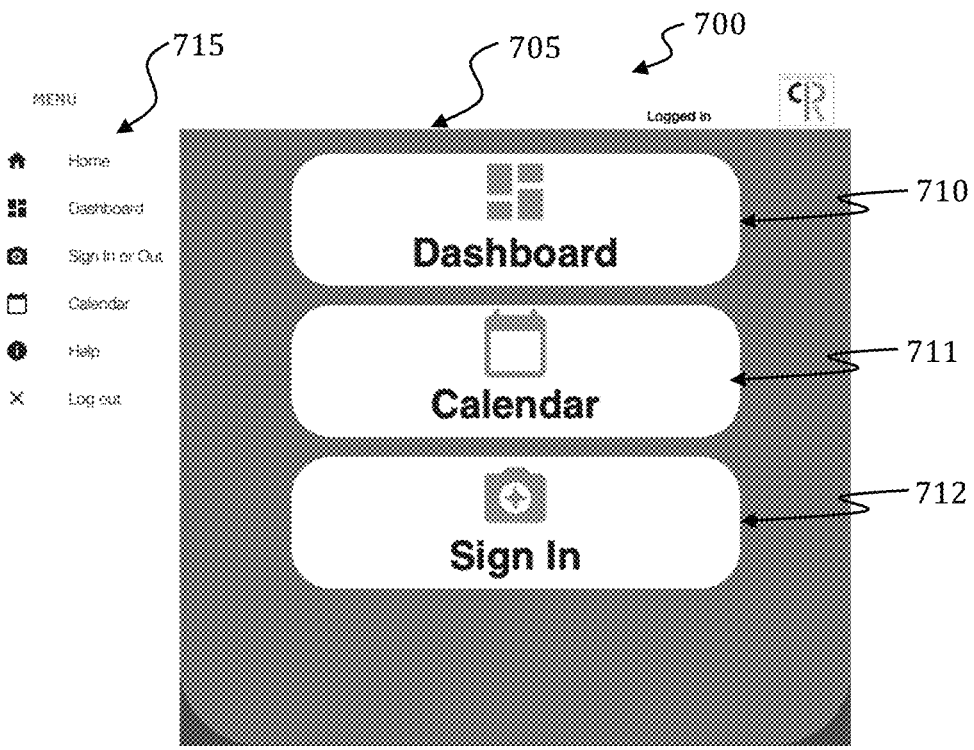
FIG. 7A depicts a home screen of a user interface of a user portal displayed on a user device, in accordance with the disclosed embodiments.
Figure 7B:
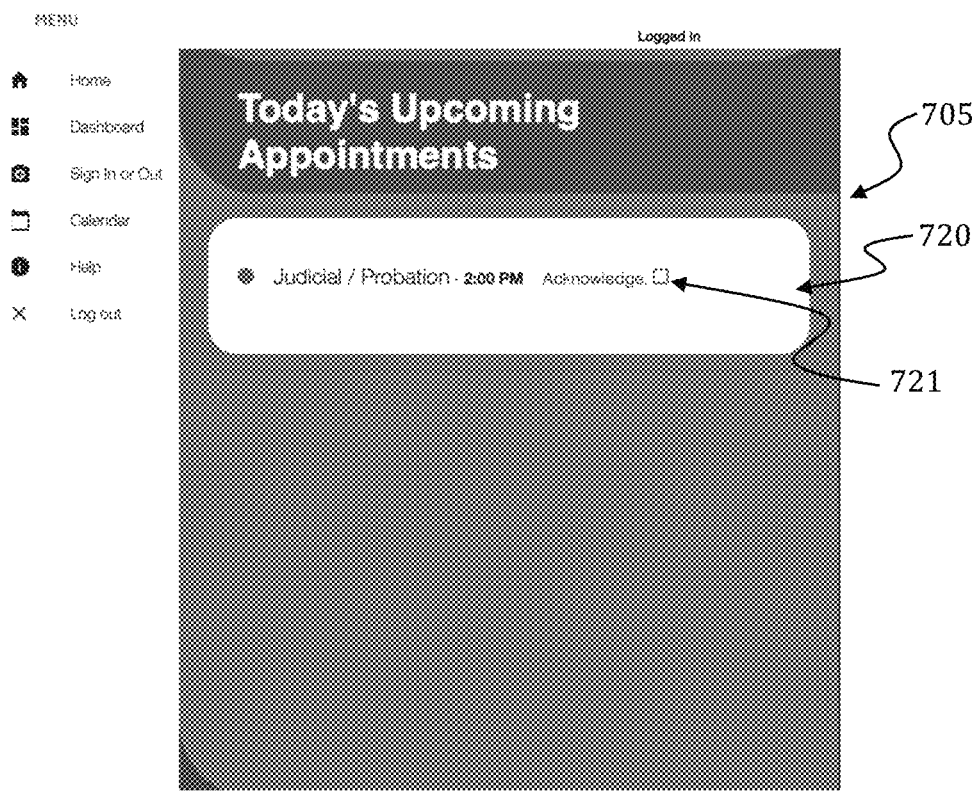
FIG. 7B depicts an upcoming appointments screen of a user interface of a user portal displayed on a user device, in accordance with the disclosed embodiments.

FIG. 7A illustrates a user home screen 705. The user home screen 705 can provide access buttons to a user dashboard 710, a calendar 711, and the sign in module 712. The user home screen 705 can further include a sidebar of links 715 to the home screen the dashboard the sign in/sign out module and the calendar module. FIG. 7B further illustrates an upcoming appointments reminder 720 that can be provided on the home screen 705. The upcoming appointments reminder 720 can be generated by the alarm module 610 and can include a list of appointments upcoming for the day. The reminders 720 can include the type of appointment, the time of the appointment, and a check box 721 where the user can acknowledge receipt of the reminder.

The acknowledgement check is an important tool for addressing accountability and preventing relapse. In many cases a relapse is not a catastrophic single day event. Instead, relapse is generally a result of missing a first appointment, and then a second, and then ignoring several appointments, until all such accountability is dismissed.

The acknowledgement check box 721 is configured to require the user to acknowledge each appointment scheduled in a given day. For many users this will include multiple appointments on that day. The acknowledgement check box 721 can be linked to the partner portal 445. In an exemplary case, the user can check the acknowledgement check box 721 to acknowledge various appointments are scheduled for the day. If the user acknowledges the appointments, that information is transmitted to the partner. However, if the user does not acknowledge appointments for a day, a flag can be provided to the partner. If the user does not acknowledge appointments for a series of days, the flag provided to the partner can escalate from, for example, a yellow status to a red status.

In situations where the partner is managing many users every day, it is impossible for the manager to physically contact each user every day to verify that they are aware of their appointments. However, the acknowledgment check box 721 allows the partner to see users who have failed to acknowledged appointments, immediately. Failing to acknowledge appointments can serve as an early warning sign to the partner of potential relapse (as opposed to an update at a monthly in person meeting which is too late to help prevent the relapse), and helps to hold the user accountable for their appointments.

Figure 7C:
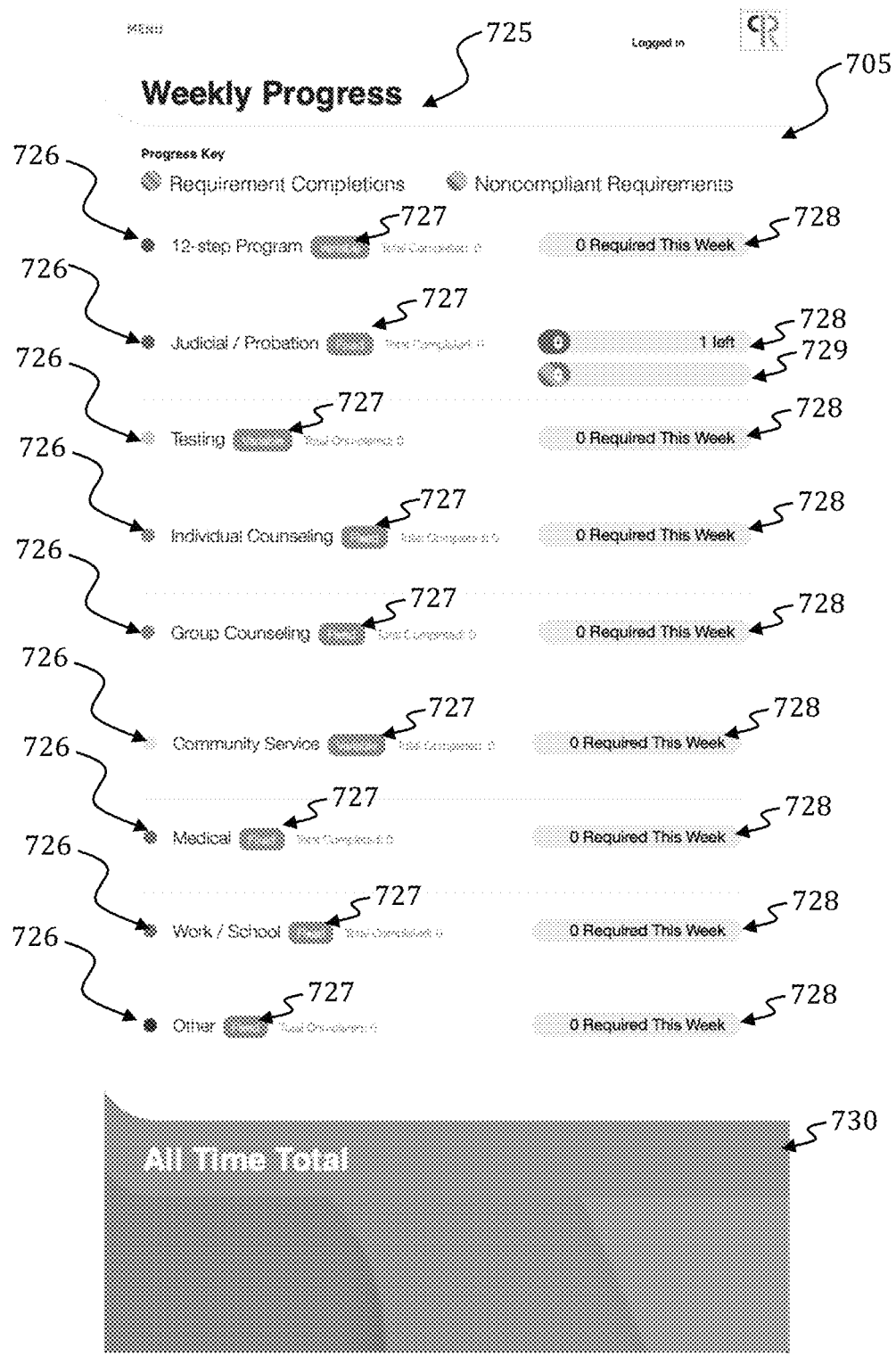
FIG. 7C depicts a weekly progress report screen of a user interface of a user portal displayed on a user device, in accordance with the disclosed embodiments.

FIG. 7C includes a weekly progress report 725 provided on the user's home screen 705. The weekly progress report 725 can include a color coded indication 726 of compliance with a selection of appointment types. In FIG. 7C the appointments provided in the weekly progress report 725 include: 12 step program (color coded blue), judicial/probation (color coded red), testing (color coded yellow), individual counseling (color coded green), group counseling (color coded orange), community service (color coded light blue), medical (color coded purple), work/school (color coded brown), and other (color coded black). It should be appreciated that these appointment types are exemplary and in other contexts other appointment type can be used.

The color coding is an important feature of the weekly progress report 725. For many users, literacy may be an issue. Color coding allows illiterate users to identify the various appointment types. The color coding can be consistent throughout the various modules of the platform.

The weekly progress report 725 can provide an indication 727 of whether the appointment type is "variable" or "fixed". A variable type appointment indicates that the user can complete the task at their convenience. For example, a user may be required to perform 10 hours of community service a week. The user can complete those hours at whatever time/day/place they choose—therefore the appointment type is variable. A fixed appointment refers to an appointment type that includes specific time and place requirements. For example, a medical appointment with a doctor must be completed at a specific time and place—and is therefore a fixed appointment type.

The weekly progress report 725 can include two indicator bars for each program type. The first indicator bar 728 for the appointment type indicates the number of appointments of that type that are required for the week. The bar can fill to indicate completion of the appointment type as the user completes appointments. For example, the user may be required to attend 5 twelve step meetings each week. The progress indicator bar 728 can show that 5 such meetings are required. When the user attends a meeting and properly verifies attendance with the system, the indicator bar can fill ⅕ of the way and a numeric indicator that 4 meetings are left can be provided.

The second indicator bar 729 can be a lifetime attendance count for the appointment type. Every time that the user attends that appointment type the associated indicator bar can increase by one. This lifetime indicator bar 729 is a means of positively reinforcing the user's attendance at required appointments. The weekly progress report 725 can further provide an "All Time Total" 730 that graphically illustrates lifetime totals for each of the appointment types. Research suggests positive reinforcement of long term accountability improves a user's ability to become self-accountable.

Figure 7D:
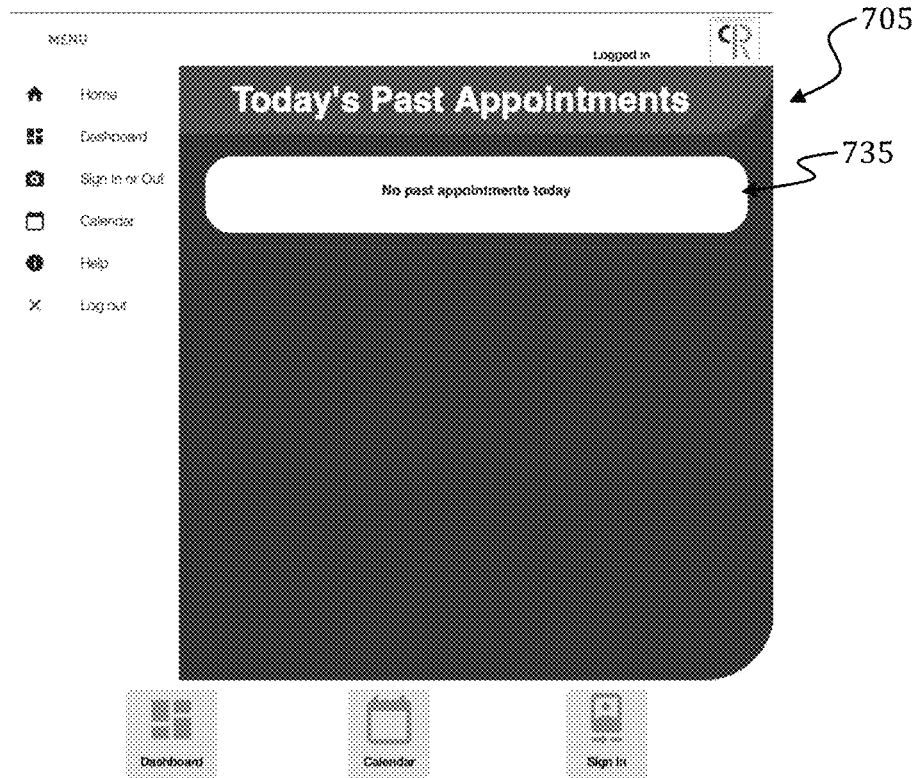
FIG. 7D depicts a past appointments screen of a user interface of a user portal displayed on a user device, in accordance with the disclosed embodiments.

FIG. 7D illustrates a screen shot of the user home screen 705, that can include a past appointments notification 735. This screen can notify the user of any missed appointments that day, and as a reward, can also indicate successfully attended appointments.

Figure 7E:
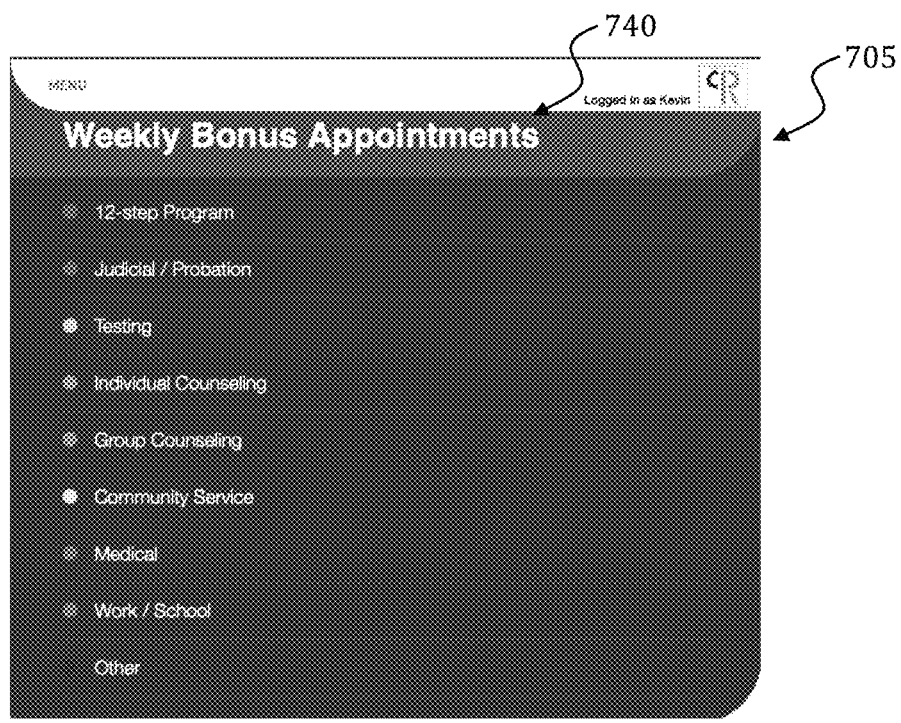
FIG. 7E depicts a weekly bonus appointments screen of a user interface of a user portal displayed on a user device, in accordance with the disclosed embodiments.

FIG. 7E illustrates a chart 740 of weekly bonus appointments, that can be provided on the home screen 705 of the user portal 410. The weekly bonus appointments are color coded with the appointment types previously provided in the weekly progress report. Bonus appointments represent, non-requisite appointments, that the user attended beyond those required. For example, if a user is required to attend 5 twelve step meetings a week, but attends one every day, for a total of seven meetings, attendance at the last two meetings can be memorialized by gold stars (or other such positive feedback indicator) on the weekly bonus appointments chart 740. The weekly bonus appointments chart 740 allows the user to catalog the steps the user is taking beyond those required, in order to positively reinforce the user's self-accountability.

Figure 7F:
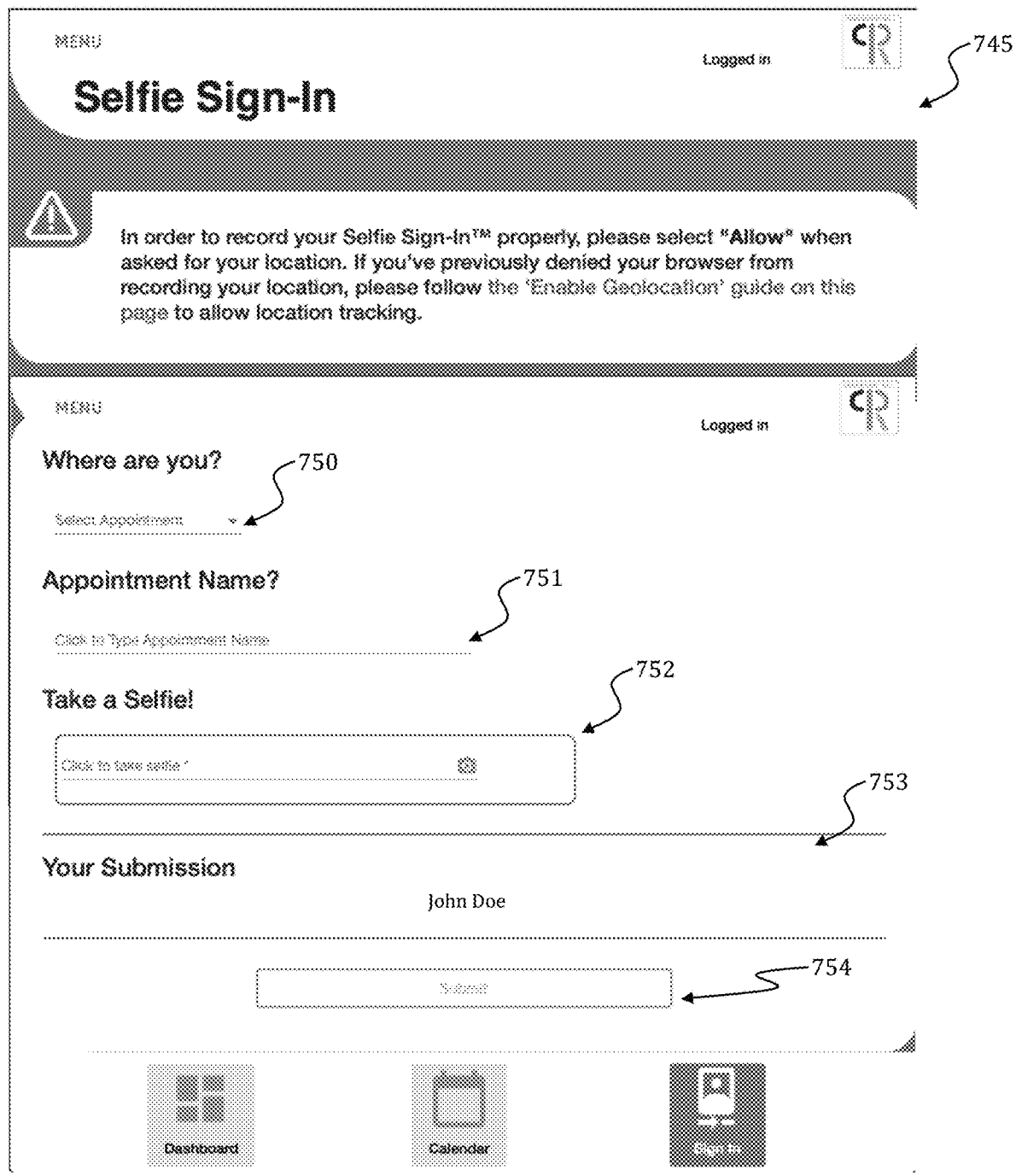
FIG. 7F depicts a user interface of a sign-in module displayed on a user device, in accordance with the disclosed embodiments.

FIG. 7F illustrates the user interface 745 for the sign-in module 615 in accordance with the disclosed embodiments. It should be appreciated that this module 615 can be used to sign-in and sign-out of an appointment as a means for verifying attendance at an appointment.

As illustrated, once the user is at the appointment the user can use a drop down menu 750 to identify the appointment type. The user can also enter a name for the appointment in the text entry field 751. Next, the user is prompted to take a photograph of themselves. Button 752 can be used to capture a photograph. The photograph can include metadata that indicates the location where the photograph was taken and the time when the photograph was taken. This can used to prevent fraudulent uploads of photos taken at a different place or time, but held out as evidence of check-in at the required appointment. Once the photo is uploaded a preview can be provided in window 753, at which point the user can submit the check-in with button 754.

After the appointment, the user can similarly be prompted to take a photograph of themselves. The photograph can include metadata including the location and time where the photograph was taken. This can be used to verify that the user attended the appointment.

Figure 7G:
FIG. 7G depicts a user interface of a calendar module displayed on a user device, in accordance with the disclosed embodiments.

FIG. 7G illustrates the user interface 755 associated with the user calendar module 605. The calendar module 605 provides a calendar view 760 of the user's appointments for the given month. For example, the calendar module 605 can provide color coded dots, the color coding matching that of the weekly progress report 725, that provides an indication of the day and time of each of the appointments for the user. The interface 755 can include an indicator of whether the user is interacting with appointments on the current day and allows the user to navigate between days. The calendar can provide an option 761 to select a month overview, as shown in FIG. 7G, a week long view, a 3 day view, or a single day view.

When the user interacts with the interface in the calendar view 760, hovering over or clicking a given day can provide a list of the appointments for that day as illustrated at 762. If the user selects an appointment, an information bar 763 can be displayed showing the details related to that appointment, including whether the appointment is fixed or variable, the type of appointment, the time of the appointment, and the location of the appointment.

Figure 7H:
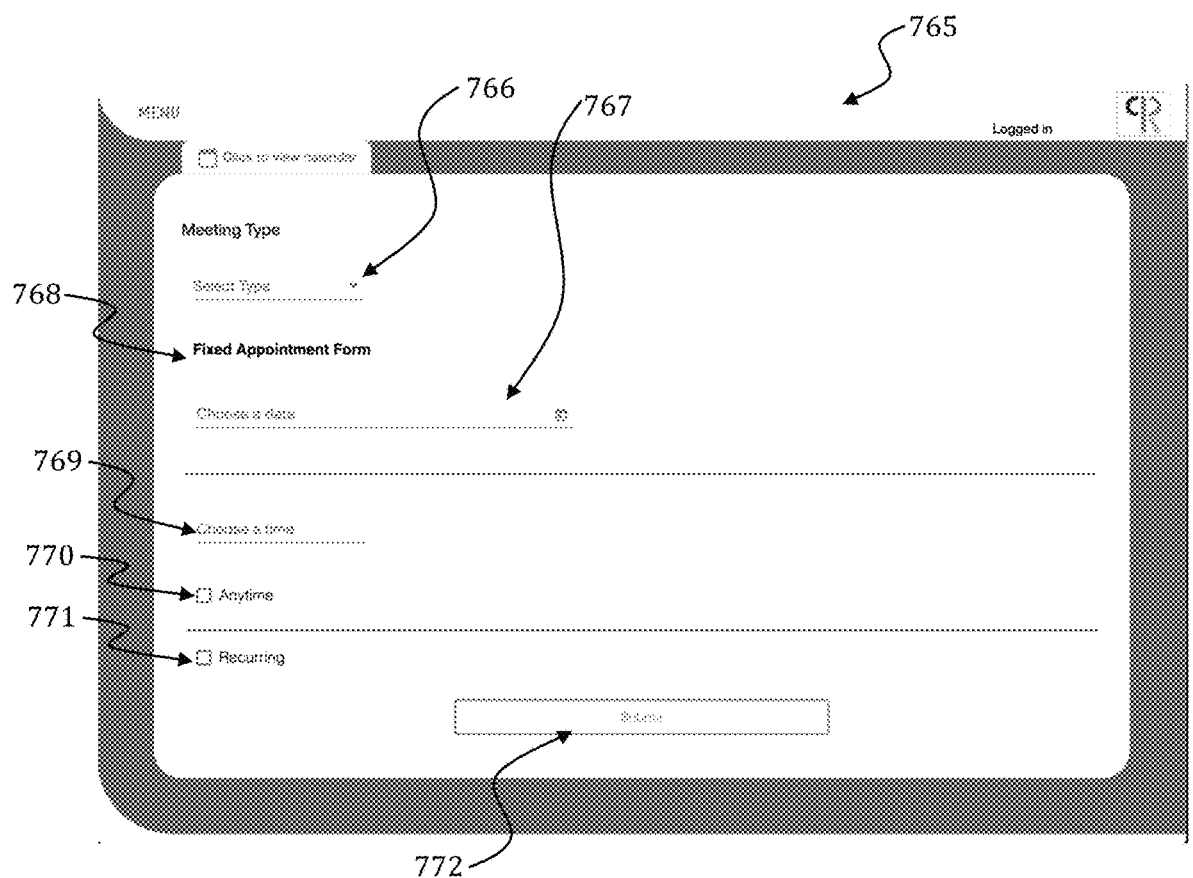
FIG. 7H depicts a user interface for adding appointment associated with a user portal displayed on a user device, in accordance with the disclosed embodiments.

The calendar view 760 also provides a button 764 to allow the user to create a new requirement. The addition of a new requirement can be provided in the user interface screen 765 as illustrated in FIG. 7H. This screen includes drop down menu 766 that allows the user to select a type of meeting and a menu 767 for setting the date of the appointment. The user can further use radio button 768 to indicate if the meeting type is fixed or variable. The user can use text field 769 to indicate the time of the meeting or can use check box 770 to indicate the appointment can be met anytime. A checkbox 771 is provided to indicate if the appointment is recurring. When the requirement is submitted with button 772, the requirement will automatically populate as a new appointment in the calendar and on the weekly progress report.

Figure 8:
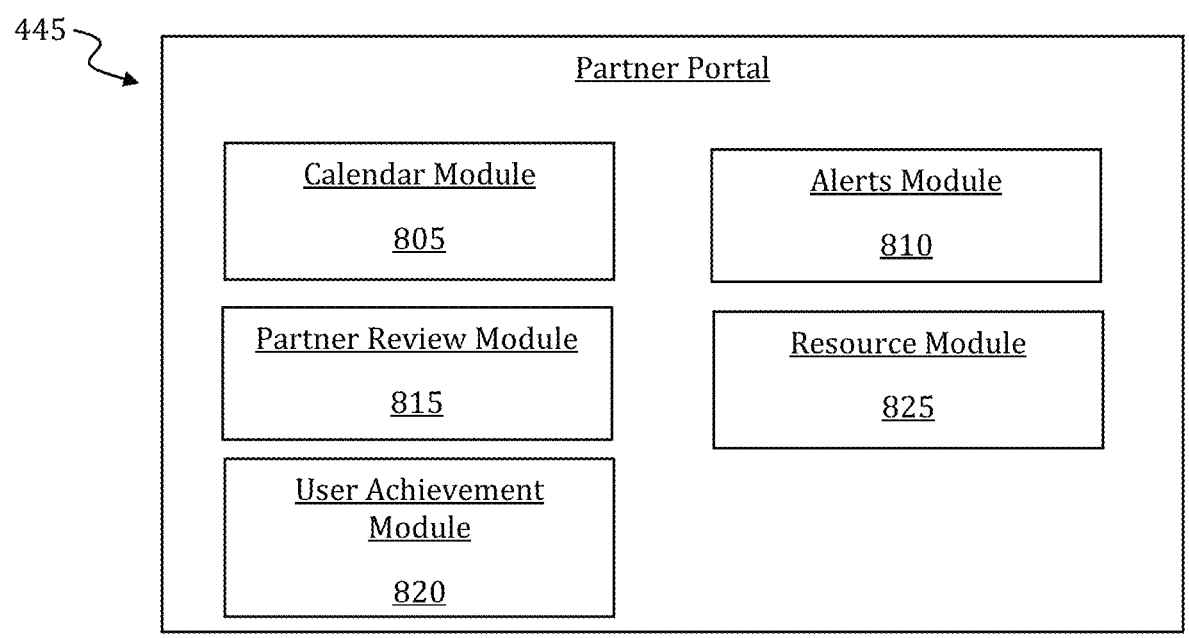
FIG. 8 depicts a block diagram of a partner portal, in accordance with disclosed embodiments.

FIG. 8 illustrates a partner or manager portal 445 in accordance with the disclosed embodiments. The manager or partner portal 445 serves as the interface through which the partner interacts with the accountability system 400. The partner portal 445 can be embodied as specially designed software that is executed by a mobile device or other computer system such as system 100. The partner portal 445 can include a partner interface embodied as a graphical user interface. The partner interface allows the partner to interact with the calendar module 805 and to view analytics for all the users the partner is managing. The interface can display upcoming appointments, and identify those appointments as mandatory or suggested, according to the designation entered by the partner. The partner interface can inform the partner of the type, time, and place of appointments for all the users the partner is managing.

An alerts module 810 can be used to alert the partner to upcoming appointments. The alerts module 810 can send push notifications, or other such notification to alert a partner that a user appointment is upcoming, or that the user missed an appointment. The alerts module 810 can further receive notice to alert the partner of an appointment that has been missed.

The partner portal 445 can further include a partner review module 815 that can be used to track data metrics, as illustrated in charts 1-5, for all the users the partner is managing. The partner review module 815 allows the partner to see analytics for each user that indicates the users' successful attendance at required appointments, missed appointments, attendance at bonus appointments, etc. The partner review module 815 can include partner-set flags that trigger notifications to the partner when a user misses a preset number of appointments, when a user is late to a certain number of appointments, when the user fails to acknowledge one or more appointments for a certain number of days, etc.

Once the accountability module 430 receives the user appointment at a user input, associated with the check-in and check-out data, the data can be provided to the data analytics module 515. The accountability module 430 can update the user's calendar module 605 to indicate that the user successfully kept the appointment, partially kept the appointment, or missed the appointment. The calendar module 605 can update the user achievement module 820 viewable in the partner portal 445 to create a log, viewable by the partner, of the successful completion of various appointments. The appointments can be color coded in the user achievement module. For example, successfully completed appointments can be coded green, partially completed appointments can be coded yellow, and missed appointments can be coded red. For suggested appointments, only successfully completed appointments can be displayed in the user achievement module 820.

FIGS. 9A-9I illustrate screen shots of an interface 900 associated with a partner or manager portal 445 in accordance with an exemplary embodiment of the system 400. It should be appreciated that these figures represent one embodiment of the interface 900 associated with manager or partner portal 445 and that the partner portal 445 can be embodied with other user interfaces in other embodiments.

As with the user portal, the partner portal 445 allows the user's recovery partner or manager to monitor the accountability metrics of the user remotely, so that the manager can reward the user for positive performance, and intervene quickly when the accountability metrics indicate the user is at risk (e.g. at risk of relapse).

Figure 9A:
FIG. 9A depicts a user list of a user interface associated with a partner portal displayed on a partner device, in accordance with the disclosed embodiments.

The partner portal 445 can include a home page 905 as illustrated in FIG. 9A. The home page 905 provides the partner a list 906 of users the partner is managing. The home screen 905 of the partner portal 445 includes button 907 allows the manager to add new users as they become users of the accountability system 400.

Figure 9B:
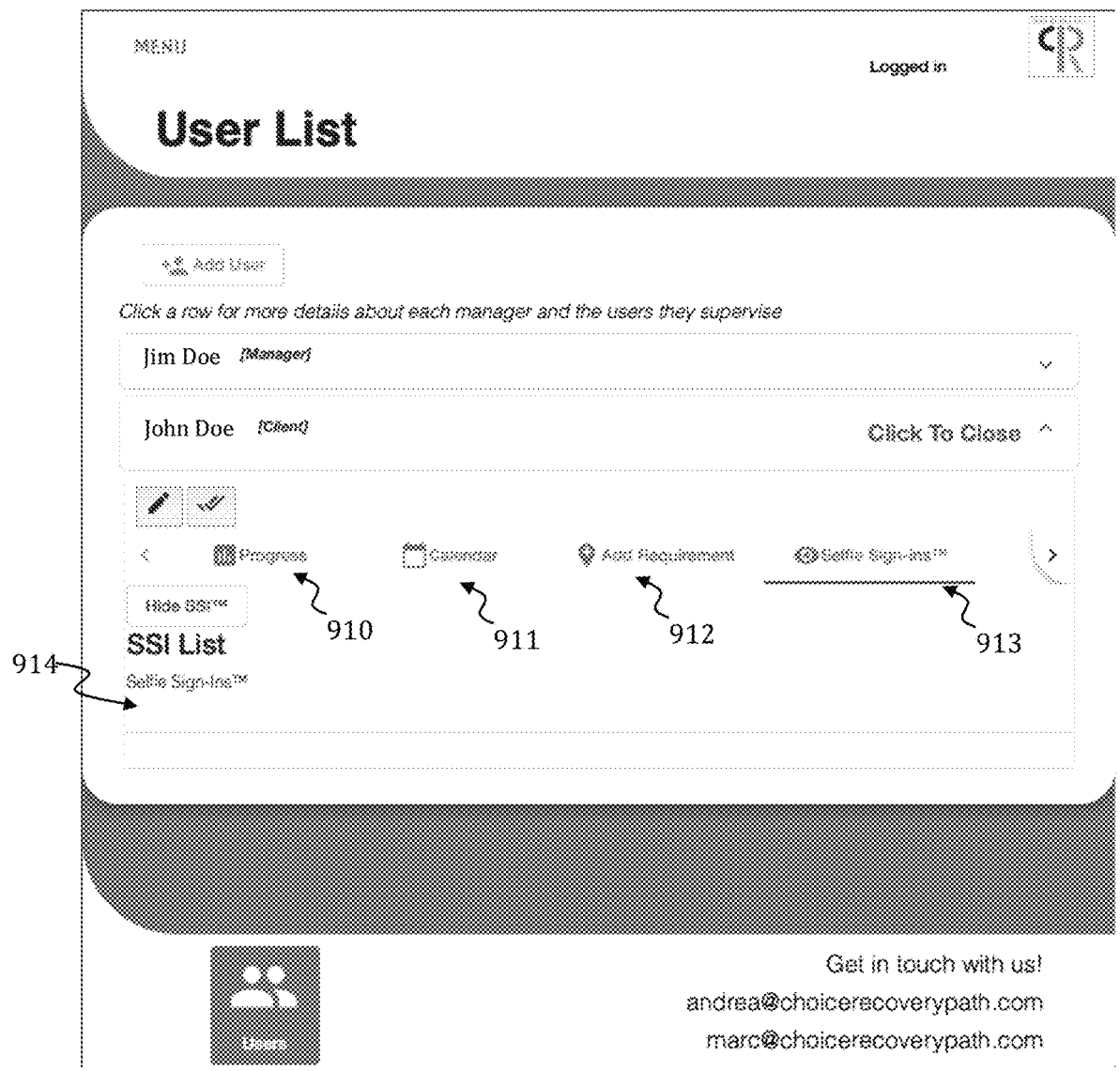
FIG. 9B depicts a user details on a user interface associated with a partner portal displayed on a partner device, in accordance with the disclosed embodiments.

The manger can select one of the users (or clients) from the list 906 of clients the manager is managing. FIG. 9B illustrates a selection of links the manager can select for each user they manage. The links can include progress link 910, a calendar module link 911, the ability to add requirements via a requirements link 912, and a user sign in check 913. In FIG. 9B, the sign in check 913 is illustrated as selected. The sign in check 913 allows the manager or partner review a list 914 all the verified sign ins for the selected user.

Figure 9C:
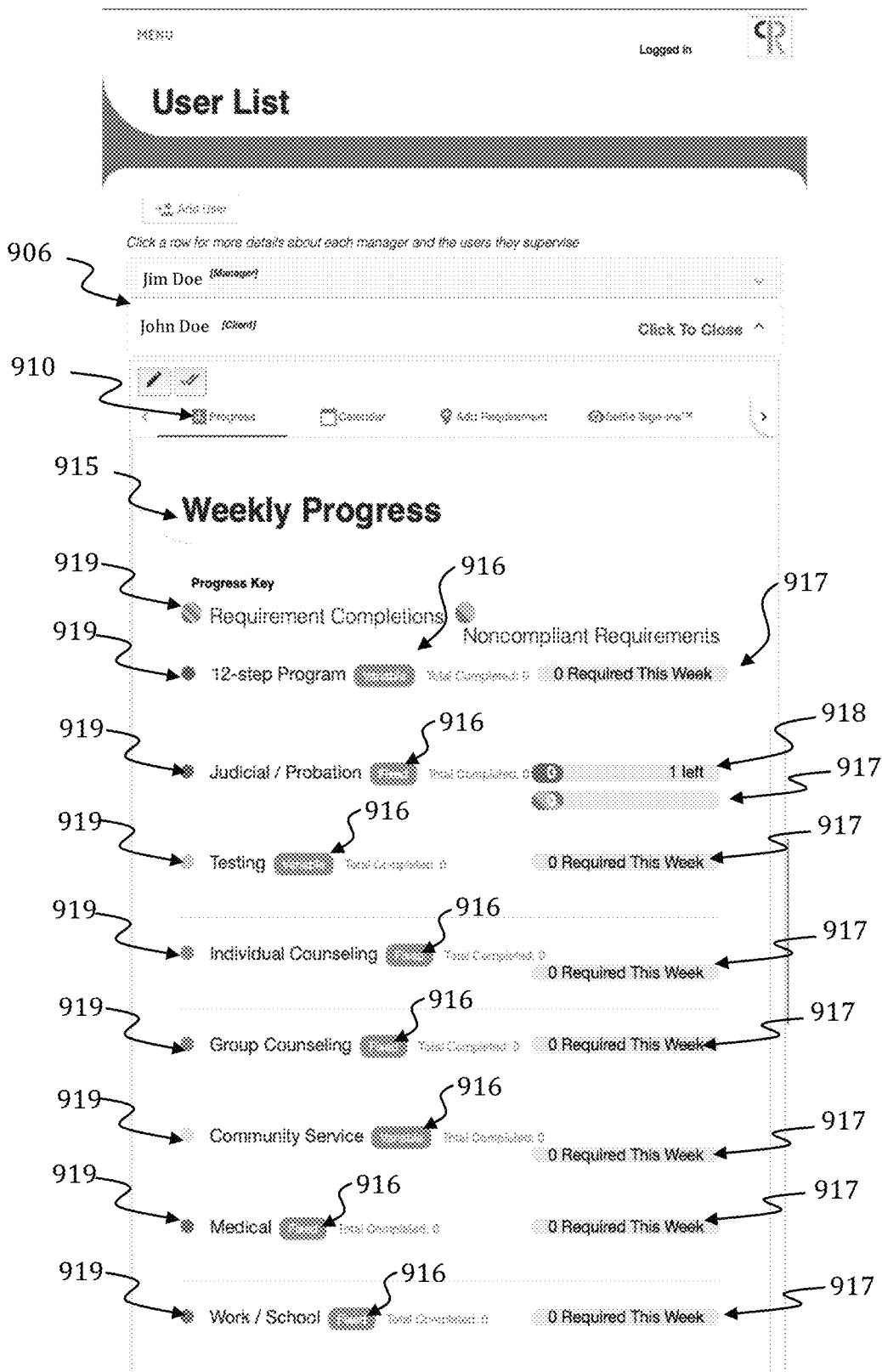
FIG. 9C depicts a weekly progress report displayed on a user interface associated with a partner portal displayed on a partner device, in accordance with the disclosed embodiments.

FIG. 9C illustrates a view of the home page after one of the users has been selected from the list 906 by the manager. In FIG. 9C the progress link 910 is illustrated as selected. A weekly progress report 915, similar to the reported provide to the user on the user's home screen can be illustrated in the manager portal 445. The weekly progress report 915 can include a color coded indication 919 of compliance with a selection of appointment types. In FIG. 9B the appointments include: 12 step program (color coded blue), judicial/probation (color coded red), testing (color coded yellow), individual counseling (color coded green), group counseling (color coded orange), community service (Color coded light blue), medical (color coded purple), work/school (color coded brown), and other (color coded black). It should be appreciated that these appointment types are exemplary, and in other contexts other appointment type can be used, where the appointment types will match those shown to the associated user in the user's module.

The weekly progress report 915 can provide an indication 916 of whether the appointment type is "variable" or "fixed". The weekly progress report 915 can include two indicator bars for each program type. The first indicator bar 917 for the appointment type indicates the number of appointments of that type that are required for the week. The bar 917 can fill to indicate completion of the appointment type as the user completes appointments. The second indicator bar 918 can be a lifetime attendance count for the appointment type for the selected user. Every time that the user attends that appointment type the associated indicator bar can increase by one.

Figure 9D:
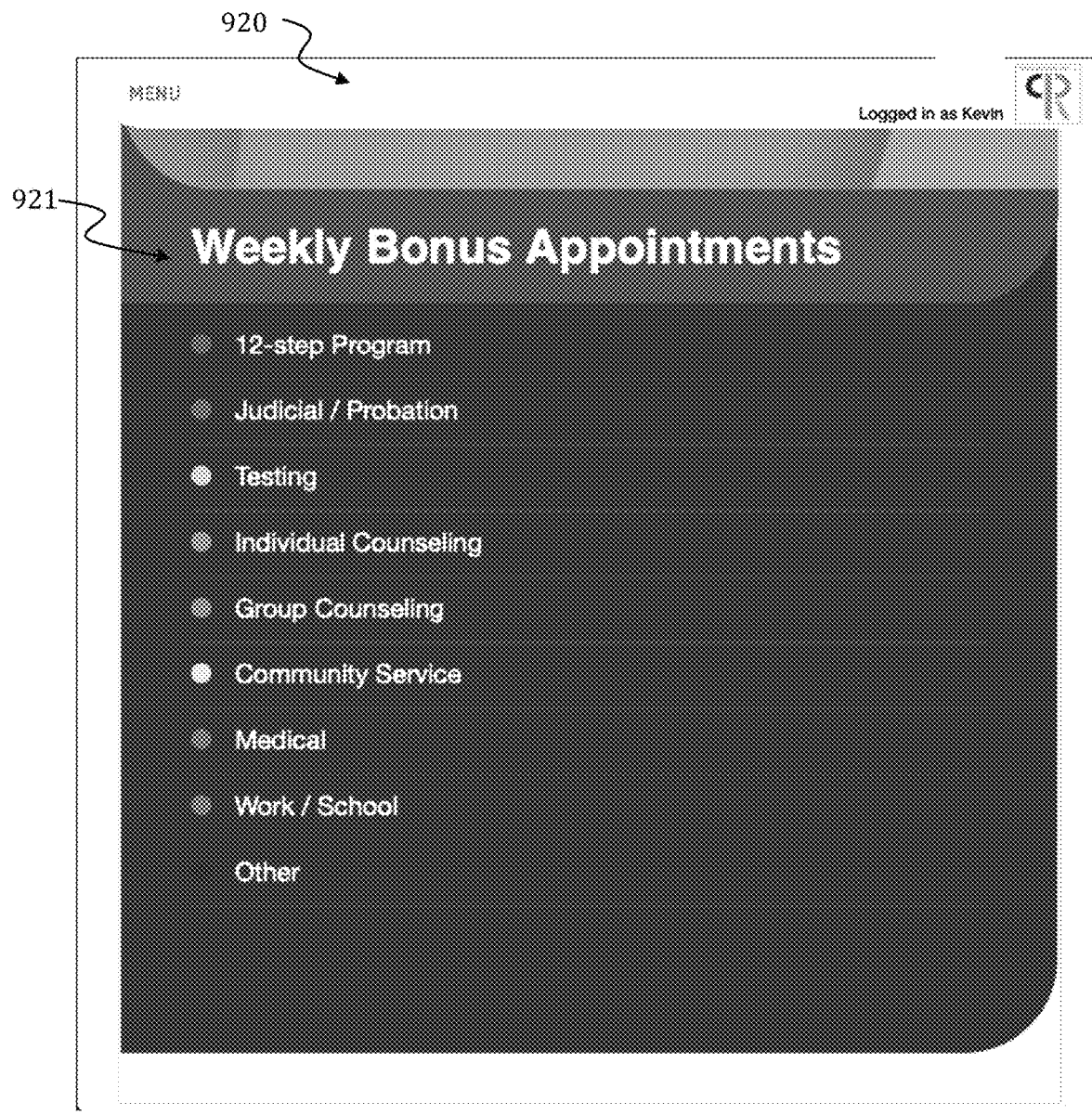
FIG. 9D depicts a weekly bonus appointments screen on a user interface associated with a partner portal displayed on a partner device, in accordance with the disclosed embodiments.

As with the user portal, the partner or manager portal 445 can also provide a view 920 of a list 921 weekly bonus appointments attended by the selected user as illustrated in FIG. 9D.

The manager or partner portal 445 can further include a compliance report 925 for each of the users managed by the partner. The compliance report 925 can be configured by the manager to illustrate compliance over a selected period of time. In the embodiment illustrated in FIG. 9E the compliance is illustrated over a week.

The compliance report 925 can include a list 926 of all of the required appointments for the user over the selected period of time. A red indicator can be used to identify requirements not met by the user. A green indicator can indicate requirements met by the user. The compliance report 925 provides the manager a quick reference for determining if the user is meeting requirements. As the user completes various tasks and/or attends appointments (verified by the sign in module) the compliance report 925 can be updated to indicate that the user has met requirements.

Figure 9F:
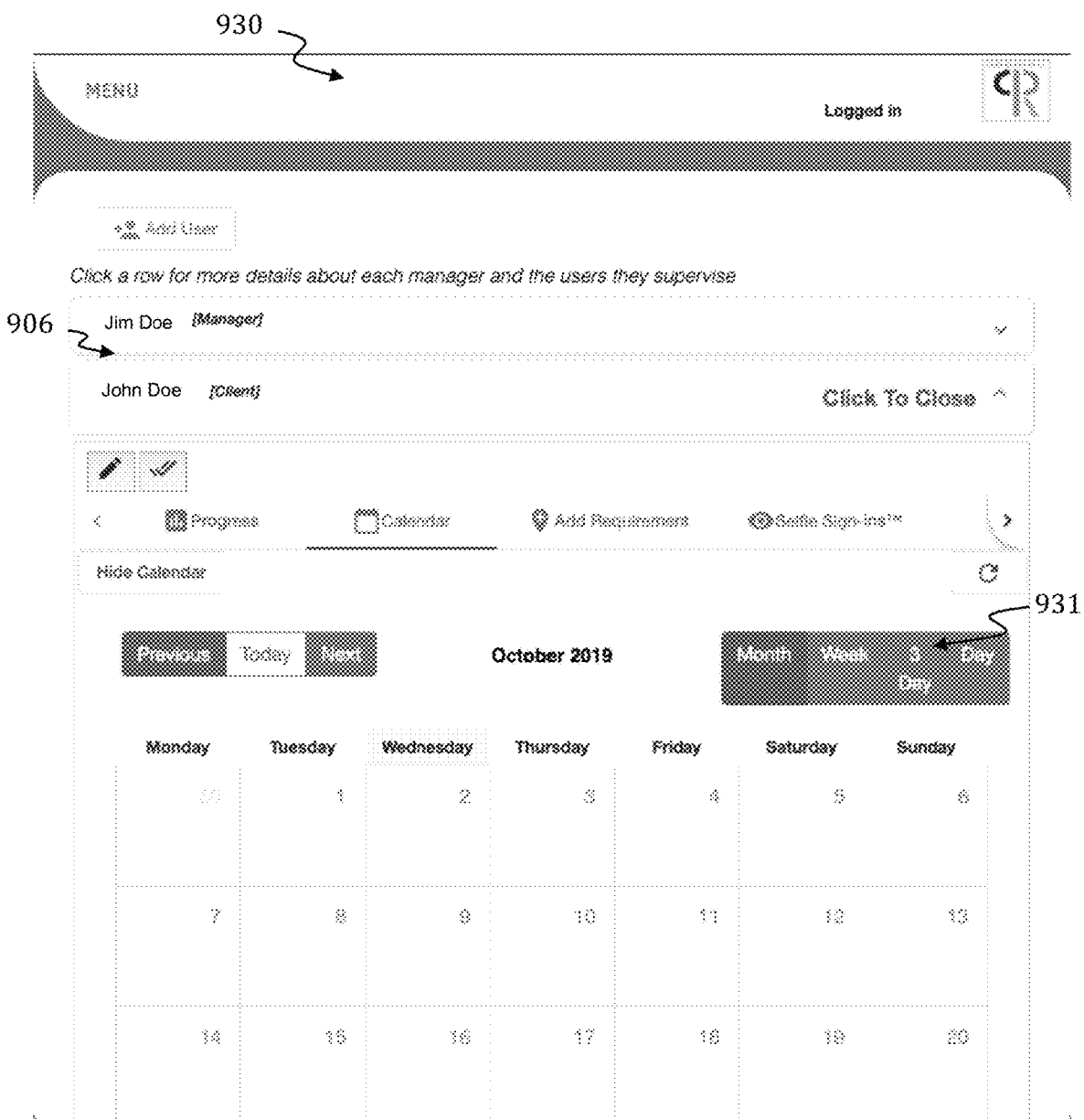
FIG. 9F depicts a calendar view displayed on a user interface associated with a partner portal displayed on a partner device in accordance with the disclosed embodiments.

FIG. 9F illustrates calendar view 930 associated with the calendar module 805 as it can be presented in the manager or partner portal 445. The calendar module 805 provides a calendar view 930 of the user's appointments for a given month. For example, the calendar module 805 can provide color coded dots, the color coding matching that of the weekly progress report, that provides an indication of the day and time of each of the appointments for the selected user. The interface can include an indicator of whether the user is interacting with appointments on the current day and allows the partner to navigate between days. The calendar can provide an option 931 to select a month overview, as shown in FIG. 9F, a week long view, a 3 day view, or a single day view.

Figure 9G:
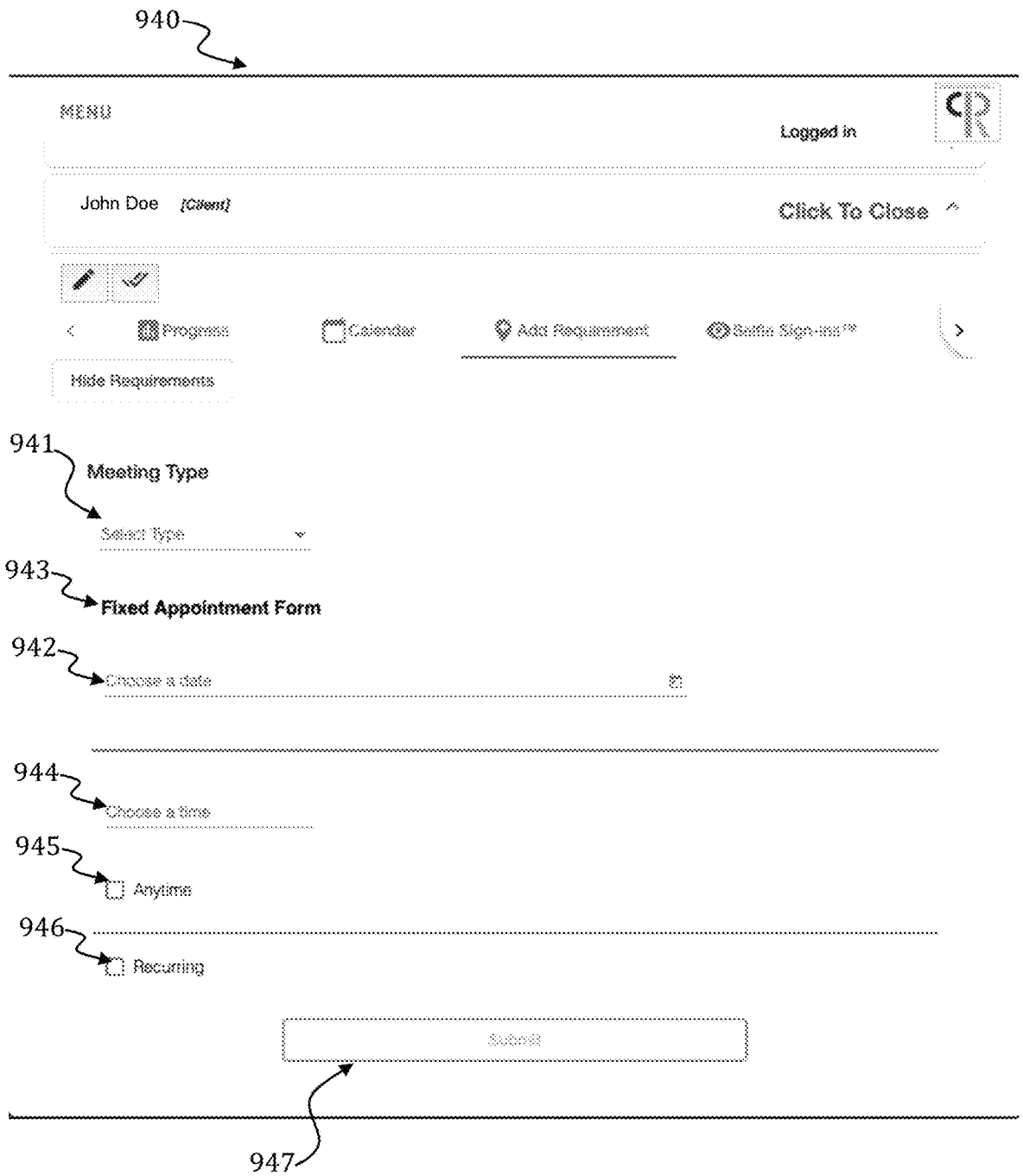
FIG. 9G depicts an interface for adding requirements associated with a partner portal displayed on a partner device, in accordance with the disclosed embodiments.

FIG. 9G illustrates a view 940 of a GUI associated with the partner module 445 that allows the partner to create a new requirement. This screen includes a drop down menu 941 that allows the partner to select a type of meeting and field 942 to enter the date of the appointment. The partner can further indicate if the meeting type is fixed or variable with field 943. The partner can specify a time of the appointment at field 944 or can check box 945 if the requirement can be met anytime. The partner can check box 946 if the appointment is recurring. When the requirement is submitted using button 947, the requirement will automatically populate as a new appointment in the calendar of the user and the partner, and on the weekly progress report for the user and the partner.

Figure 9H:
FIG. 9H depicts a compliance report for a selected user displayed on a user interface associated with a partner portal displayed on a partner device, in accordance with the disclosed embodiments.

FIG. 9H illustrates a compliance report view 950 associated with the partner module 445. The compliance report view 950 provides a list 951 of compliance checks that the partner can use to monitor the compliance of the user. The compliance report view 950 can include a color coded list 951 of requirement types. For each of the requirements, the compliance report can include an indicator 952 of the type of requirement, an indicator 953 of the date/time associated with the requirement. The report can include an indicator 954 of the requirement being compulsory or a bonus, an indicator 955 of a sign-in start time, an indicator 956 of variance, an indicator 957 of the duration between the sign in and sing out time, an indicator 958 of the compliance status, and an indicator 959 of the client name. The compliance report view 950 can be organized as a list of all outstanding requirements for a given period of time (i.e. a week). The compliance report view 950 gives the partner/manager the ability to quickly verify if the user is in compliance with their weekly requirements.

Figure 9I:
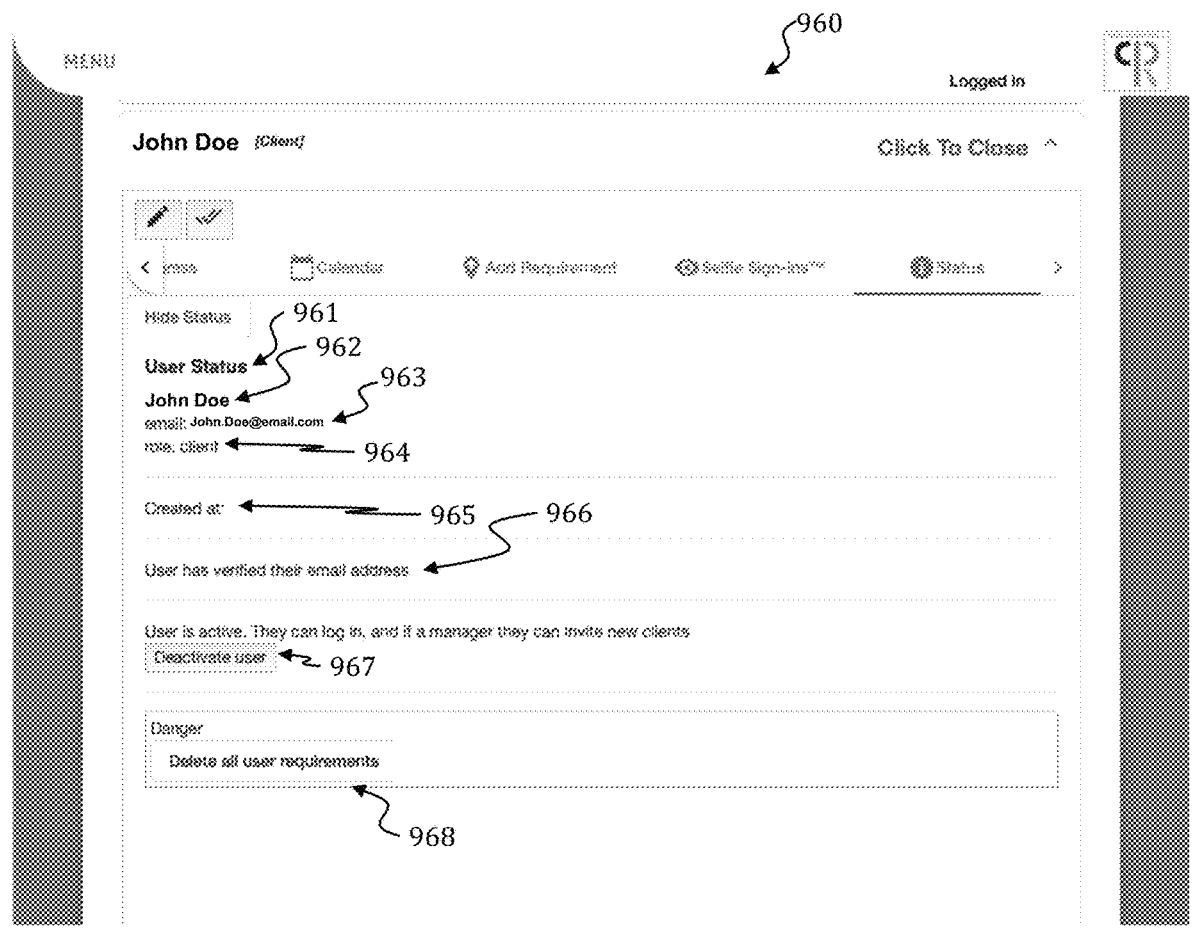
FIG. 9I depicts a user status report displayed on a user interface associated with a partner portal displayed on a partner device in accordance with the disclosed embodiments.

FIG. 9I illustrates a user status view 960, viewable by the manager. The user status interface view 960 can give the manager the ability to manage various administrative aspects of the system 400. It should be appreciated that this and other aspects of the system 400 that require confidentiality can be configured to ensure they are compliant with various data and record keeping rules for health records, such as the Health Insurance Portability and Accountability Act.

The user status interface view 960 can include the user status 961, user name 962, user email address 963, role 964, date of creation 965, and an indication of whether the user has verified their account via email 966. From this screen the manager can deactivate the user account with button 967. In addition, the manager can delete all user requirements using button 968. However, because this action will erase all user requirements, it can be verified with a verification that the manger wants to delete all the requirements, before final removal of all the requirements.

Figure 10:
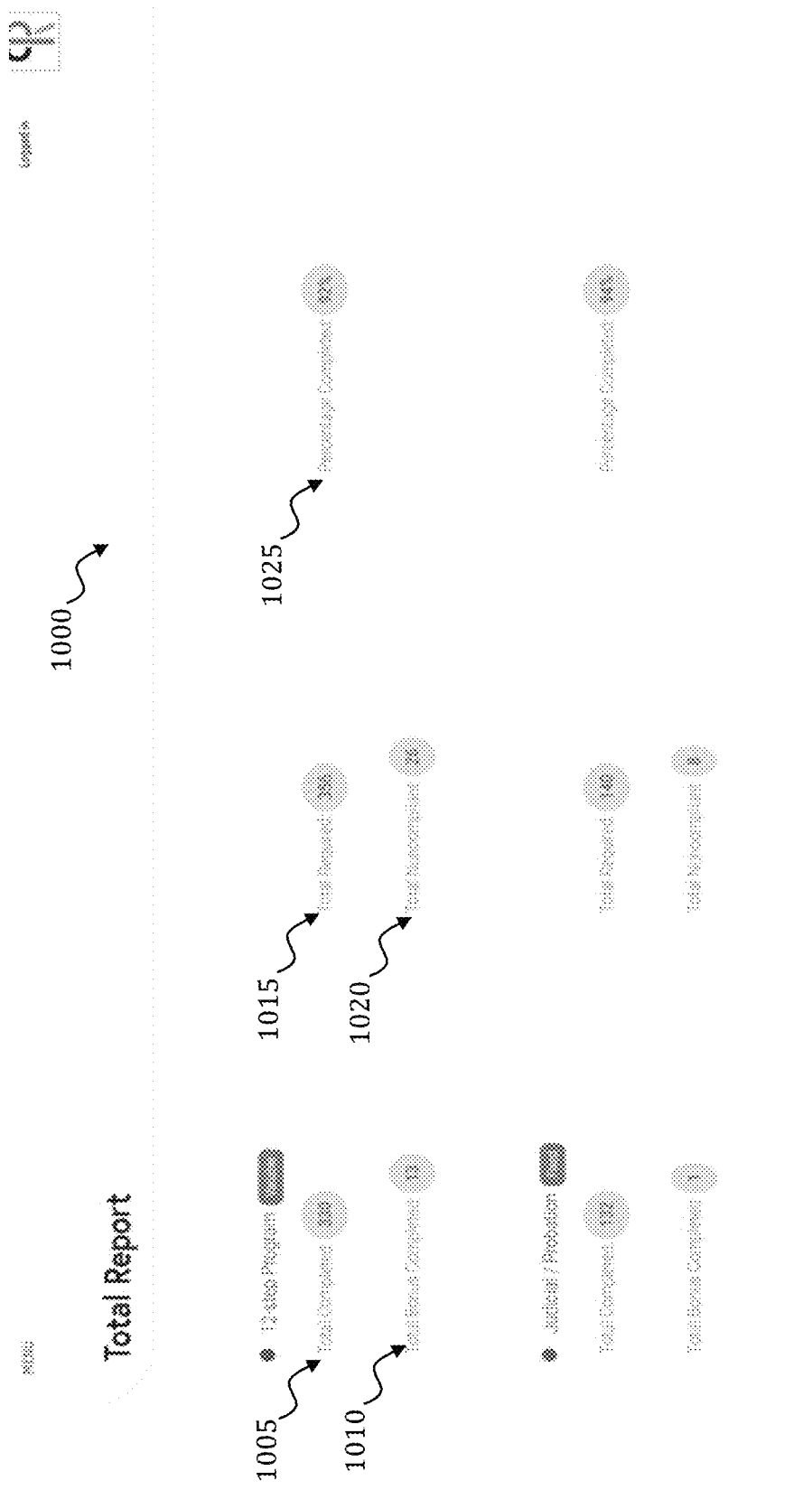
FIG. 10 depicts a total report displayed on a user interface associated with a partner portal displayed on a partner device in accordance with the disclosed embodiments.

FIG. 10 illustrates a analytics interface 1000 that provides analytics collected at any hierarchical level. The analytics can be used to determine the efficacy of the user as compared to others at an equivalent hierarchical layer using the system 400. As illustrated in FIG. 10, the analytics interface 1000 can illustrate various metrics for each of the requirements. For example, for each of the requirement types, the analytics interface 1000 can show the total completed requirements 1005 for all those being managed by the manger, and the bonus requirements 1010 completed. The interface can further show the total number of requirements 1015 and the percentage of completed requirements 1025. The analytics interface can further show the total number of non-compliant user's 1020 being managed by the manager. This information can be provided for each requirement type and total metrics across all requirement types can be provide.

FIGS. 4-10 illustrate various components and interfaces of the system 400. The following illustrates various features and methods associated with the system 400 disclosed in FIGS. 4-10. The system 400 can operate within a context of systems—not only data systems, but behavior modification systems.

Thus, in an embodiment the system 400 can provide a digital platform that helps the process of evolution by ensuring that people and agencies have means and mechanisms to follow through on the decision to change and implement the choices they make. The system 400 eliminates falsification, manipulation, coercion and requires the client to be accountable for him or herself.

Figure 12:
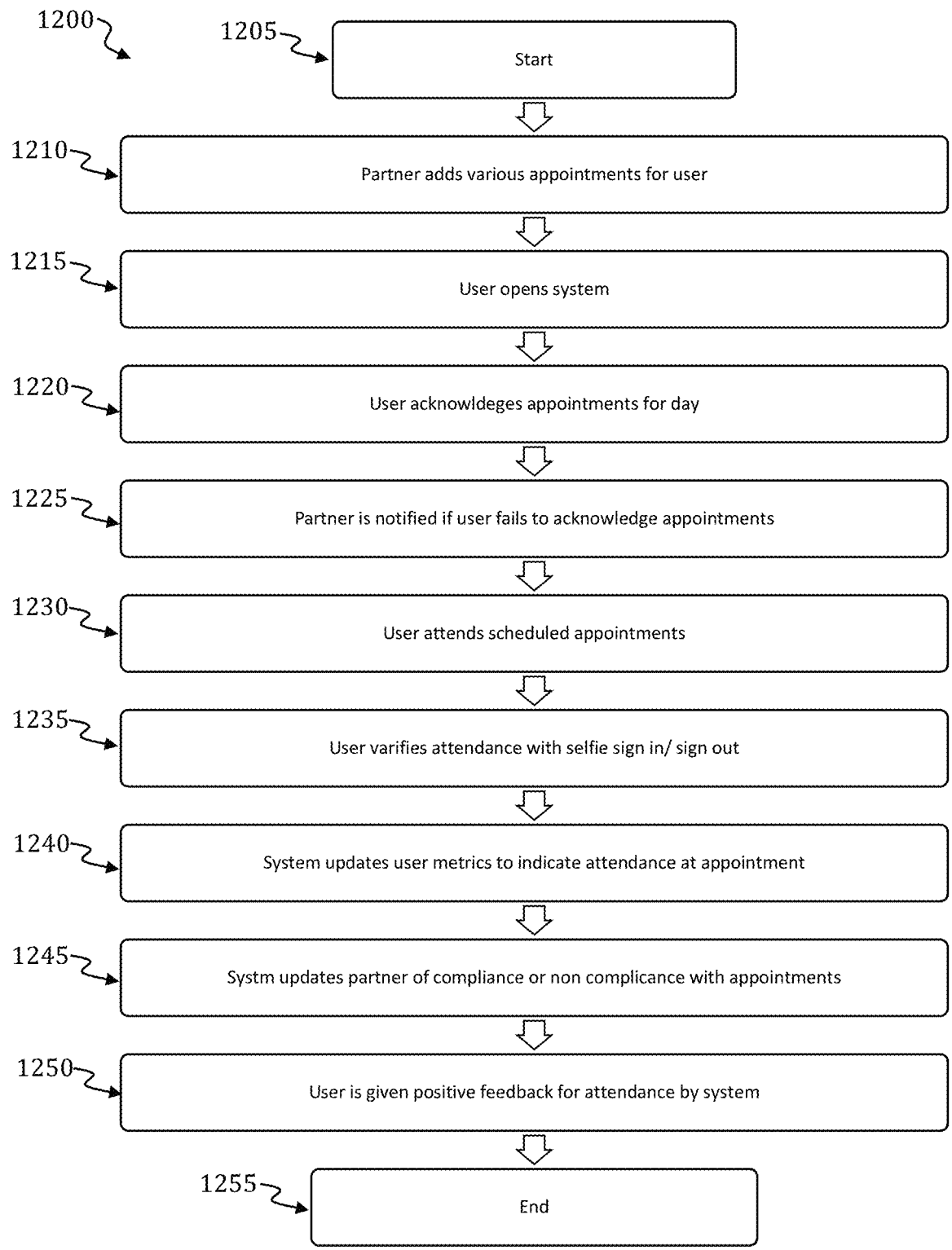
FIG. 12 depicts steps in an accountability and recovery method, in accordance with the disclosed embodiments.

FIG. 12 illustrates a method 1200 associated with the system 400 disclosed herein for accountability and compliance. The order of steps illustrated in this method 1200 are exemplary and associated methods can include a rearrangement of the order of these steps without departing from the scope of embodiments disclosed.

The method 1200 being at step 1205. In an exemplary embodiment, a user can register and create an account. The user can then be assigned a partner, or may already have a partner.

At this point the partner can add various requirements for the user as shown at 1210. The requirements can include all those things the partner believes will aid the user in recovery, judicial requirements, work requirements, educational requirements, and the like. The manager/partner can denote the frequency of each of the various requirements and indicate if the requirements are compulsory or optional.

When the user opens the system at step 1215, all of the requirements for the user for the given day can be displayed to the user. The user can be prompted to acknowledge such appointments at step 1220. This acknowledgement requires the user to begin the process of learning to be self-compliant. The acknowledgement further tells the manger that the user has engaged with the system. If the user fails to acknowledge requirements for a day or a few days, the manger can receive a notification as shown at step 1225 that the user may be sliding toward recidivism or relapse.

As the user attends the required appointments for the day at step 1230, the user can verify their attendance using the system. The user can sign in and sign out with the system to verify their attendance at step 1235. The disclosed system 400 can be used to verify attendance. As the user attends the appointments and verifies attendance the system can update the user metrics as shown at 1240 to indicate that the user has attended the appointments. The system can further update the manager or partner at 1245, to indicate if the user has complied with the various requirements. As the user completes requirements and/or bonus appointments the system gives the user positive feedback at step 1250 to encourage the user. The method ends at 1255.

It should be understood that various steps in the method can be repeated or rearranged and that the method continues each day, helping the user to learn to be accountable to themselves and others.

Figure 13:
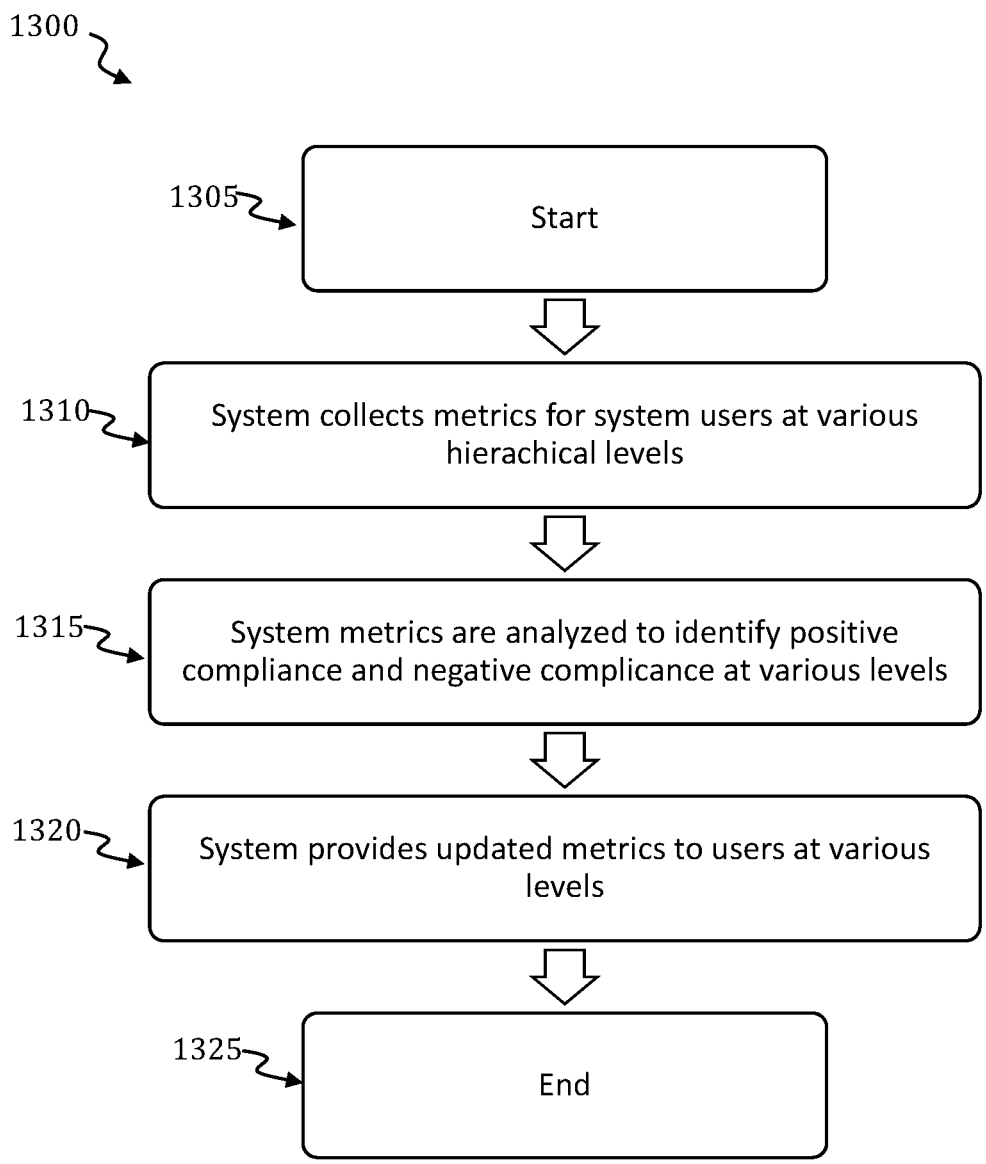
FIG. 13 depicts steps in a data acquisition method associated with accountability and recovery, in accordance with the disclosed embodiments.

FIG. 13 illustrates a method 1300 for data collection and aggregation to identify systemic success and failures associated with user compliance using the systems disclosed herein. The method begins at 1305.

As various steps are completed in the method of FIG. 12 using the system disclosed herein, the system 400 can collect information related to the manager and aggregate that information with previously collected information from the manager (or other hierarchical user) as illustrated at 1310. The system metrics can be analyzed at step 1315 by requirement type, compliance rate, etc. to identify trends for the manager/partner. As the metrics are analyzed a user interface can be used to represent those metrics to a user at various levels as shown at 1320. The metrics allow system users to determine those managers that are effectively managing users and to help identify those areas where the manger can improve performance and offer better service to users. The method ends at 1325.

The disclosed systems and methods make real-time, broad-spectrum, holistic data available to each level of administration within any organization or agency, that enables those bodies to pinpoint who and what is working— and not working—and make changes accordingly. Because the results are available in real time, organizations have unprecedented flexibility and fluidity in response to metrics.

Regardless what a particular agency does or the population it serves, the system can give them more accurate tools to address issues, whatever they are. For example, in certain embodiments learning algorithms can be used to improve outcomes. The system can provide aggregation of broad community metrics based on individual data. The individual patient is one data point where many such data points can be used to extrapolate outcomes for a whole community.

The disclosed systems provide engagement of the client in an interactive, real time relationship with their accountability partner. This contrasts sharply with prior approaches, which require forced compliance, and enforced accountability through passive monitoring of clients, negative reinforcement/"violation" centered models.

By leveraging digital processes and tools to achieve learning outcomes for improved long term benefits, the system brings together self-directed learning techniques with real-time personal accountability, rather than negative reinforcement and a passive-coercive approach.

Because the system operates from a model of choice it offers marked improvement in outcomes. The user takes ownership of his or her own process and compliance. The geotagged and time stamped "selfie sign in" eliminates both the falsifiable/manipulative component, and the coercive dynamic, by offering clear verifiable data and tools that resist corruption or manipulation. This method of generating engaged accountability rather than passive coercion, shifts the dynamic of stipulated responsibilities in treatment/corrections from an overwhelming impasse to an interactive learning process. Also, the system can help improve outcomes through connection to local resources targeted at the specific problems the user identifies.

The systems and methods can be used to personalize outcomes to the individual. It carries broad scope life metrics. Tracking across different life areas means that administrators have access to interdisciplinary data points. This data means that targeted, localized changes can be driven toward process outcomes and directional improvement.

It should be appreciated that the example embodiments have been directed to certain contexts. However, in other embodiment the interface can drive toward broad data aggregation rather than narrow, individual data tracking. The system can generate broad datasets based on differing use case outcomes as well as demographic, local or staff-based breakdowns of information.

A key to this system is remote accountability regardless of geographic location. Even for clients who leave the county or state can still accessible to accountability partners The system further offers broader industrial benefits. Almost every industry has a need for compliance and accountability. By bringing this notion of multivariable, non-tracking, non-passive accountability into various contexts the system can be used in other forms from college athletes to offsite workers to people seeking to make diet/lifestyle changes to address chronic health conditions.

The system can be modular and is adaptable across industries and modalities. The systems and methods can be applied across a wide range of applications. The integration of features provide a defined model, based on AI-potentiated data analytics. While the nine categories on the Y-axis are changeable in themselves, they are also flexible and combinable in terms of how that data may be analyzed.

For example, any employees who work remotely, away from direct supervision, can provide a potential use case for the system—not only because it can provide the ability to "punch in" and "punch out" using the selfie sign in, but because they can sign in to different billing iterations, and the company can make use of the resource platform to provide workers with the resources they need to complete their tasks. The system can verify in/out times at locations;

integration between home office and workers in the field in real time; integration of resources and intersecting services through the platform. Maximizing efficiency while allowing workers autonomy both in their accountability and in integrated data acquisition.

In addition, the system provides the ability to accurately know where people are and whether they are complying with requirements. It also allows real time changes to scheduling through the calendar and can be useful for transport workers, regional sales forces, military, corrections, and enforcement agencies, academic programs, including athletic programs, scholarship and support programs, and remedial support programs for students in development.

For example, the system can help students meet the various requirements of their programs across disciplines—getting to class, tutoring, practice, medical appointments, etc.—again, real time accountability and verification allows intervention by coaches and support workers before setbacks grow into problems.

The sign in/sing out module (i.e. selfie sign-in) can be a three layered tool that simultaneously identifies, locates, and time-stamps a photo. It accurately and instantly categorizes event, text adds identifiers, geolocated, and can use artificial intelligence algorithms (e.g. a Naive Bayes algorithm or other such algorithm) for facial recognition, providing time stamped verification that a user is where they are supposed to be.

The system can also provide a blank resource platform—configurable with pertinent resources that the end user may want/need to pinpoint their needs. Client populated, segmentable geographically, vetted by users/administrators to ensure accuracy. In embodiments, the resource platform can be populated by/for programs that work with substance abuse clients and their various needs. But a university or work force application may make use of that resource platform in other embodiments.

In an exemplary embodiment the system can be used to help clients structure their recovery as they reintegrate into life, by helping to support integration of multimodal treatments, and providing accountability and data for client compliance within and across agencies. The system also provides compliance and accountability as clients meet stipulated requirements. The system is flexible enough to accommodate various protocols and requirements customized to each client even as it continues to aggregate data into meaningful and useful statistics to help address recidivism and program failure. The system also highlights successes within programs for clients and staff members; shows who and what works optimally to improve outcomes; again, verifiable, non-falsifiable data available in real-time to enforcement and accountability partners.

The disclosed systems are meant to help teach people skillsets they don't have. Through practice and repetition the system can help clients make a choice to do something different. The system includes tools that help them learn skills around scheduling, accountability, and compliance. The system thus includes a learning platform. For example, accountability partners can add mandatory schedules, but clients themselves can add appointments so they can continue to use the calendar. In this way, the calendar gradually becomes their own.

In additional embodiments, targeted outcomes for clients can be provided. In certain embodiments the system can use artificial intelligence to predictively help people over the course of extended timespans by identifying patterns in behavior at an early stage, making early intervention possible. The skills that clients need offer the chance to create long term success modeling, so as a person improves, the system can adapt to build accountability.

Continuous use of the systems and methods allows the demonstration of improvement over time. Setting baselines (first using the app blindly to set a control)—then adding a scoring system to indicate success or failure—made or missed appointments, timeliness, accuracy, other metrics can be provided. Then targets can be set first by the accountability partner, and then by the client, over time.

In certain embodiments the system can use common variables to predict and improve compliance. Artificial Intelligence can be used to perform pattern seeking in behaviors. For example, does the client excel at work but not at meeting attendance? The system can help accountability partners analyze these patterns, or flags can be created based on such data analysis automatically.

When the system identifies what works or doesn't for individual clients, the system can target programming—and also make local, immediate, programming decisions that pinpoint personal and local challenges. Why are a group of clients failing at a particular metric? Why are staff members more/less successful overall, or among themselves? Another question might be, do clients excel at meeting attendance but not community service? Why? Another question might be, are there 12-step meetings accessible to the client? What compensatory services can we as a county provide, absent these? From these questions the system can create true success indicators for the client and extrapolate from those, better outcomes for managers by targeting areas of noncompliance overall.

Any manager will be able to see how they are connecting with their clients by seeing how the clients are doing at compliance within certain categories that might be indicative of larger problems. For example, one client group might be universally compliant at testing but not at participating in treatment. This allows programs to target program interventions at particular challenges within their own modality, or to particular manager's performance.

By aggregating even the basic data, the system can radically reduce administrative time spent in paperwork and program audits. Real time views of staff performance allows unprecedented analysis of staff needs and strengths. The system can collect and integrate data from a number of contexts—is the client showing up at work, as well as health care, counseling, judicial obligations, etc.?

Because the client, rather than their manager, is generating data, it saves staff time and reduces administrative paperwork. The system can also reduce or eliminate human error in collecting that data. The system ensures actual compliance, and produces real time data on the manager dashboard. The manager can be passive in the process. And like the phone module, the desktop features can work remotely—anywhere in the world.

This improves outcome for administration to see how well their staff is performing without meetings, audits or additional work—real time data on manager success. What starts on the client end of things as beneficial for them extrapolates up into data metrics within and across the organization.

The Manager's dashboard or portal likewise reinforces positive behavior—encourages both clients and managers to go above and beyond compliance to higher levels of action based on positive reinforcement. Going to more meetings, etc., generates gold stars for a client, but also allows a manager to see success/risk factors in real time; managers' aggregated data allows staff members to be more influential in personal relationship with clients because accountability is the client's responsibility, rather than staff member, so the staff member is a partner rather than adversary.

For example, desktop, real time compliance data collected by the system can keep a corrections officer from having to be investigator and moves them to client support role. Thus, the system provides accountability for the managers. The system clearly illustrates who is succeeding with clients and in what pinpoint, real time ways a given manager—or program—is succeeding or not.

The system allows an administrator to review data from their organization and optimize it, testing solutions in real time. At the Superadmin level, the system can compare regionally or organizationally what's working and what isn't working. The system can be used to mine out the nuggets of wisdom hidden in smaller programs and target programs or offices with particular challenges (there are no 12 step meetings in a certain town; how does that impact the success/failure of autonomous program in that town?).

Based on the foregoing, it can be appreciated that a number of embodiments, preferred and alternative, are disclosed herein. For example in certain embodiments, an accountability system comprises a user device, the user device comprising a GPS receiver, a camera, and a computer system, the computer system further comprising: at least one processor, a graphical user interface, and a computer-usable medium embodying computer program code, the computer-usable medium capable of communicating with the at least one processor, the computer program code comprising instructions executable by the at least one processor and configured for: displaying at least one required action, validating a user check-in and a user check-out associated with the at least one required action, and tracking user completion of the at least one required action; and a partner device, the partner device comprising a second computer system, said second computer system further comprising: at least one processor, and a computer-usable medium embodying computer program code, the computer-usable medium capable of communicating with the at least one processor, the computer program code comprising instructions executable by the at least one processor and configured for: adding the at least one required action for display on the user device, and monitoring the user completion of the at least one required action.

In an embodiment, the system further comprises an accountability module, the accountability module being configured for generating a calendar served to the client device with a calendar module according to the at least one required action added with the partner device.

In an embodiment, the calendar module further displays the at least one required action on a calendar displayed on the user device.

In an embodiment, the system further comprises a user sign in module, the user sign in module configured for: identifying a current time, identifying a current location of the user device, and collecting an image of the user with the user device. In an embodiment, the system further configured for verifying the image of the user against a stored image, verifying the current location of the user device is within a geofenced location associated with a current required action, and verifying the current time matches a time associated with a current required action.

In an embodiment, the system further comprises a resource list provided on the user device with the graphical user interface.

In an embodiment, the system further comprises an alerts module, the alerts module configured for providing a notification of at least one of an upcoming required action and a missed required action.

In an embodiment, the at least one required action further comprises a type comprising one of: a 12 step program, a judicial/probation requirement, a testing requirement, an individual counseling requirement, a group counseling requirement, a community service requirement, a medical requirement, a work requirement, and an other requirement. The at least one required action displayed on the user device can be color coded according to the type.

In an embodiment an accountability system comprises a user device, the user device comprising a computer system, said computer system further comprising at least one processor, a GPS receiver, a camera, a graphical user interface, and a computer-usable medium embodying computer program code, the computer-usable medium capable of communicating with the at least one processor, the computer program code comprising instructions executable by the at least one processor and configured for: displaying at least one required action, validating a user check-in and a user check-out associated with the at least one required action using a user sign in module, the user sign in module configured for: identifying a current time, identifying a current location of the user device, and collecting an image of the user with the user device, and tracking user completion of the at least one required action; a partner device, the partner device comprising a second computer system, the second computer system further comprising: at least one processor; and a computer-usable medium embodying computer program code, the computer-usable medium capable of communicating with the at least one processor, the computer program code comprising instructions executable by the at least one processor and configured for: adding the at least one required action for display on the user device and monitoring the user completion of the at least one required action; and an accountability module, the accountability module being configured for generating a calendar served to the client device with a calendar module.

In an embodiment, the accountability module updates a calendar module on the user device, wherein the calendar module displays the at least one required action on a calendar displayed on the user device.

In an embodiment, the user sign in module is further configured for verifying the image of the user against a stored image, verifying the current location of the user device is within a geofenced location associated with a current required action, and verifying the current time matches a time associated with a current required action.

In an embodiment, a method for tracking accountability comprises adding at least one required action for display on a user device, with a partner device, displaying at least one required action on a user device, validating a user check-in and a user check-out associated with the at least one required action with the user device, tracking user completion of the at least one required action with the user device, and monitoring the user completion of the at least one required action with the partner device.

In an embodiment, the method further comprises displaying a calendar with the user device indicating the at least one required action, prompting user acknowledgement of the at least one required action scheduled for a present day.

In an embodiment the method further comprises identifying a current time with a user sign in module, verifying the current time matches a time associated with the at least one required action, identifying a current location of the user device with a GPS receiver associated with the user device, verifying the current location of the user device is within a geofenced location associated with the at least one required action, collecting an image of the user with the user device, and verifying the image of the user against a stored image of the user.

In an embodiment of the method the at least one required action further comprises a type comprising one of a 12 step program, a judicial/probation requirement, a testing requirement, an individual counseling requirement, a group counseling requirement, a community service requirement, a medical requirement, a work requirement, and an other requirement.

It should be appreciated that variations of the above-disclosed and other features and functions, or alternatives thereof, may be desirably combined into many other different systems or applications. It should be understood that various presently unforeseen or unanticipated alternatives, modifications, variations or improvements therein may be subsequently made by those skilled in the art which are also intended to be encompassed by the following claims.

What is claimed is:

1. An accountability system comprising:
a user device, the user device comprising a GPS receiver, a camera, and a computer system, the computer system further comprising:
at least one processor;
a graphical user interface; and
a computer-usable medium embodying computer program code, the computer-usable medium capable of communicating with the at least one processor, the computer program code comprising instructions executable by the at least one processor and configured for:
displaying at least one required action, the required action being selected from a group of action types comprising a 12 step program, a judicial/probation requirement, a testing requirement, an individual counseling requirement, a group counseling requirement, a community service requirement, a medical requirement, a work/school requirement, and an other requirement;
validating a user check-in to the at least one required action;
validating a user check-out associated with the at least one required action at a time after the validated user check-in;
tracking user completion of the at least one required action;
creating a log of successful completion of the at least one required action with an achievement module, the log being viewable on the graphical user interface of the user device; and
a partner device, the partner device comprising a second computer system, said second computer system further comprising:
at least one processor; and
a computer-usable medium embodying computer program code, the computer-usable medium capable of communicating with the at least one processor, the computer program code comprising instructions executable by the at least one processor and configured for:
adding the at least one required action for display on the user device; and
monitoring the user completion of the at least one required action.

2. The accountability system of claim 1 further comprising:
an accountability module, the accountability module being configured for generating a calendar served to the user device with a calendar module according to the at least one required action added with the partner device.

3. The accountability system of claim 2 wherein the calendar module further displays the at least one required action on a calendar displayed on the user device; and
the accountability module provides an upcoming appointments reminder of an upcoming appointment, the upcoming appointments reminder comprising:
an action type of the upcoming appointment;
a time of the upcoming appointment; and
a user input configured to acknowledge the upcoming appointment.

4. The accountability system of claim 2 further comprising:
a user sign in module, the user sign in module configured for:
identifying a current time;
identifying a current location of the user device; and
collecting an image of the user with the user device.

5. The accountability system of claim 4 further comprising:
verifying the image of a user against a stored image.

6. The accountability system of claim 4 further comprising:
verifying the current location of the user device is within a geofenced location associated with a current required action at a time of the user check-in; and
verifying the current location of the user device is within a geofenced location associated with a current required action at a time of the user check-out.

7. The accountability system of claim 4 further comprising:
verifying the current time matches a time associated with a current required action.

8. The accountability system of claim 1 further comprising:
a resource list provided on the user device with the graphical user interface.

9. The accountability system of claim 1 further comprising:
an alerts module, the alerts module configured for providing a notification of at least one of:
an upcoming required action; and
a missed required action.

10. The accountability system of claim 1 further comprising:
adding successful completion of bonus appointments to the log of successful completion of the at least one required action with an achievement module, the bonus appointments comprising non-requisite appointments of a type comprising one of:
a 12 step program;
a judicial/probation requirement;
a testing requirement;
an individual counseling requirement;
a group counseling requirement;
a community service requirement;
a medical requirement;
a work/school requirement; and
an other requirement.

11. The accountability system of claim 1 wherein the at least one required action displayed on the user device can be color coded according to the type of appointment.

12. An accountability system comprising:
a user device, the user device comprising a computer system, said computer system further comprising:
   at least one processor;
   a GPS receiver;
   a camera;
   a graphical user interface; and
   a computer-usable medium embodying computer program code, the computer-usable medium capable of communicating with the at least one processor, the computer program code comprising instructions executable by the at least one processor and configured for:
      displaying at least one required action the at least one required action displayed being color coded according to the type of appointment;
      validating a user check-in associated with the at least one required action using a user sign in module, the user sign in module configured for: identifying a current time; identifying a current location of the user device; and collecting an image of the user with the user device;
      validating a user check-out at a time after the user check-in and associated with the at least one required action, using a user sign in module; and
      tracking user completion of the at least one required action;
      creating a log of successful completion of the at least one required action with an achievement module, the log being viewable on the graphical user interface of the user device;
      providing a first indicator bar on the graphical user interface indicating a weekly log of required actions and completed required actions;
      providing a second indicator bar on the graphical user interface indicating a lifetime attendance count of completed required actions;
   a partner device, the partner device comprising a second computer system, the second computer system further comprising:
      at least one processor; and
      a computer-usable medium embodying computer program code, the computer-usable medium capable of communicating with the at least one processor, the computer program code comprising instructions executable by the at least one processor and configured for:
         adding the at least one required action for display on the user device; and
         monitoring the user completion of the at least one required action; and
   an accountability module, the accountability module being configured for generating a calendar served to the user device with a calendar module.

13. The accountability system of claim 12 wherein the accountability module updates a calendar module on the user device, wherein the calendar module displays the at least one required action on a calendar displayed on the user device and provides an upcoming appointments reminder of an upcoming appointment, the upcoming appointments reminder comprising:
   an action type of the upcoming appointment;
   a time of the upcoming appointment; and
   a user input configured to acknowledge the upcoming appointment.

14. The accountability system of claim 13 wherein the user sign in module is further configured for:
   verifying the image of the user against a stored image.

15. The accountability system of claim 13 wherein the user sign in module is further configured for:
   verifying the current location of the user device is within a geofenced location associated with a current required action.

16. The accountability system of claim 13 wherein the user sign in module is further configured for:
   verifying the current time matches a time associated with a current required action.

17. A method for tracking accountability, the method comprising:
   adding at least one required action for display on a user device, with a partner device;
   displaying at least one required action on a user device;
   validating a user check-in associated with the at least one required action with the user device;
   validating a user check-out associated with the at least one required action with the user device;
   tracking user completion of the at least one required action with the user device;
   displaying a log of successful completion of the at least one required action with an achievement module, the log being viewable on a graphical user interface of the user device; and
   monitoring the user completion of the at least one required action with the partner device.

18. The method for tracking accountability of claim 17 further comprising:
   displaying a calendar with the user device indicating the at least one required action; and
   prompting user acknowledgement of the at least one required action scheduled for a present day.

19. The method for tracking accountability of claim 17 further comprising:
   identifying a current time with a user sign in module;
   verifying the current time matches a time associated with the at least one required action;
   identifying a current location of the user device with a GPS receiver associated with the user device;
   verifying the current location of the user device is within a geofenced location associated with the at least one required action;
   collecting an image of the user with the user device; and
   verifying the image of the user against a stored image of the user.

20. The method for tracking accountability of claim 17 wherein the at least one required action is selected from a group of action types comprising:
   a 12 step program;
   a judicial/probation requirement;
   a testing requirement;
   an individual counseling requirement;
   a group counseling requirement;
   a community service requirement;
   a medical requirement;
   a work/school requirement; and
   an other requirement;
   wherein each action type in the group of action types is color coded.

* * * * *